(12) United States Patent
Okuda et al.

(10) Patent No.: US 11,352,003 B2
(45) Date of Patent: Jun. 7, 2022

(54) VEHICLE CONTROL DEVICE, VEHICLE CONTROL METHOD, AND VEHICLE

(71) Applicant: Hitachi Automotive Systems, Ltd., Hitachinaka (JP)

(72) Inventors: Yuuki Okuda, Tokyo (JP); Takashi Okada, Ibaraki (JP); Naoyuki Tashiro, Ibaraki (JP); Yoichi Iihoshi, Tokyo (JP); Yuto Imanishi, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 134 days.

(21) Appl. No.: 16/633,225

(22) PCT Filed: Jun. 28, 2018

(86) PCT No.: PCT/JP2018/024505
§ 371 (c)(1),
(2) Date: Jan. 23, 2020

(87) PCT Pub. No.: WO2019/021734
PCT Pub. Date: Jan. 31, 2019

(65) Prior Publication Data
US 2020/0180620 A1 Jun. 11, 2020

(30) Foreign Application Priority Data
Jul. 26, 2017 (JP) .............................. JP2017-144305

(51) Int. Cl.
*B60W 30/14* (2006.01)
*B60W 30/165* (2020.01)

(52) U.S. Cl.
CPC ........ *B60W 30/143* (2013.01); *B60W 30/165* (2013.01)

(58) Field of Classification Search
CPC ............. B60W 30/143; B60W 30/165; B60W 2720/106; B60W 2556/45;
(Continued)

(56) References Cited

U.S. PATENT DOCUMENTS

2012/0109510 A1* 5/2012 Ota ...................... G08G 1/0104
701/400
2015/0059692 A1* 3/2015 Johansson ............. F02D 31/001
123/350
2015/0306957 A1* 10/2015 Sujan .................. B60W 30/143
701/94

FOREIGN PATENT DOCUMENTS

JP 2003-205770 A 7/2003
JP 2006-137235 A 6/2006
(Continued)

OTHER PUBLICATIONS

International Search Report (PCT/ISA/210) issued in PCT Application No. PCT/JP2018/024505 dated Sep. 4, 2018 with English translation (four (4) pages).

(Continued)

*Primary Examiner* — Abby Y Lin
*Assistant Examiner* — Danielle Marie Jackson
(74) *Attorney, Agent, or Firm* — Crowell & Moring LLP

(57) ABSTRACT

A vehicle control device includes a determination unit, a speed control unit, and a recommended speed acquisition unit. The recommended speed acquisition unit acquires a first recommended speed, being a new recommended speed related to a first section. The determination unit determines a magnitude relationship between the first recommended speed and the first recommended speed. The speed control unit controls the speed of the vehicle to be maintained at a speed of the first recommended speed in the first section when the determination unit determines that the first recommended speed is less than the first recommended speed.

13 Claims, 15 Drawing Sheets

(58) Field of Classification Search
CPC ....... B60W 2554/406; B60W 2520/10; B60W 2554/802; B60W 30/16; B60W 2720/103; G08G 1/09; G08G 1/16; G01C 21/3469; B60K 2031/0091
See application file for complete search history.

(56) References Cited

FOREIGN PATENT DOCUMENTS

| | | |
|---|---|---|
| JP | 2007-133664 A | 5/2007 |
| JP | 2010-89691 A | 4/2010 |
| JP | 2012-30665 A | 2/2012 |
| JP | 2012-224316 A | 11/2012 |
| WO | WO 2011/036855 A1 | 3/2011 |
| WO | WO-2013060530 A1 * | 5/2013 .......... B60W 50/082 |

OTHER PUBLICATIONS

Japanese-language Written Opinion (PCT/ISA/237) issued in PCT Application No. PCT/JP2018/024505 dated Sep. 4, 2018 (six (6) pages).

* cited by examiner

VEHICLE CONTROL DEVICE, VEHICLE CONTROL METHOD, AND VEHICLE

TECHNICAL FIELD

The present invention relates to a vehicle control device and the like that controls traveling of a vehicle on the basis of a recommended speed for the vehicle in accordance with traffic conditions.

BACKGROUND ART

In recent years, automatic acceleration and deceleration control has been developed to control acceleration and deceleration of a vehicle so as to maintain an inter-vehicle distance from a preceding vehicle by recognizing the preceding vehicle using a front recognition sensor such as a camera or a radar. This automatic acceleration and deceleration control is performed such that when an own vehicle approaches a preceding vehicle, the own vehicle is decelerated by reducing engine output or by operating a friction brake to increase an inter-vehicle distance from the preceding vehicle. The automatic acceleration and deceleration control is also performed such that when the inter-vehicle distance from the preceding vehicle is increased, or when the preceding vehicle is removed from a travel route of the own vehicle, the own vehicle is accelerated to a predetermined speed by increasing the engine output. This kind of control enables the own vehicle to travel in accordance with surrounding vehicles while maintaining the inter-vehicle distance so as not to collide with the preceding vehicle. For example, there is a known fact that operation of a brake is suppressed during traveling in automatic acceleration and deceleration control to enable fuel consumption to be suppressed.

As a technique related to automatic acceleration and deceleration control, for example, there is a known technique in which when an own vehicle is set in an eco-following mode, deterioration of a fuel consumption rate is suppressed by allowing the own vehicle to travel with a lower acceleration than that in a normal following mode (e.g., see PTL 1). As another technique, there is known a technique for acquiring information on a forward slope road using a navigation system and supporting traveling at a constant vehicle speed by allowing a vehicle speed change in an opposite direction ahead of the slope road (e.g., see PTL 2). As yet another technique, there is proposed a technique in which speed information on a vehicle traveling around an own vehicle is acquired by communication, and acceleration of the own vehicle is adjusted to allow the own vehicle to travel at a speed in accordance with a traffic flow (e.g., see PTL 3).

CITATION LIST

Patent Literature

PTL 1: JP 2007-133664 A
PTL 2: JP 2010-89691 A
PTL 3: JP 2012-30665 A

SUMMARY OF INVENTION

Technical Problem

For example, it is conceivable that automatic acceleration and deceleration control is performed such that a speed (recommended speed) suitable for traveling in accordance with surrounding traffic conditions is acquired from a navigation system in a vehicle or the outside to control acceleration and deceleration of the vehicle in accordance with the acquired recommended speed.

For example, when a vehicle can continuously acquire a recommended speed corresponding to a location at which the vehicle travels, it is preferable to control the vehicle in accordance with the recommended speed. However, it is practically difficult in terms of cost or the like to always allow the recommended speed at that location to be obtained.

In consideration of cost or the like, when a navigation system provides a recommended speed, it is appropriately conceivable to provide the recommended speed in a form of allowing the recommended speed to be superimposed on a road (route) such as that between intersections or curve section so that the vehicle can acquire the recommended speed. In addition, when a recommended speed is provided by communication to allow a vehicle to acquire the recommended speed, it is appropriate to provide the recommended speed corresponding to a section or a period in which a start and an end are set spatially or temporally, such as a road or next few seconds, and to allow the vehicle to obtain the recommended speed.

When the recommended speed provided as described above is obtained and the vehicle is controlled in accordance with the recommended speed, increase in length of a road section corresponding to a certain recommended speed, or increase in time period corresponding to the certain recommended speed, may increase a discrepancy between the acquired recommended speed and an actually preferred speed at a location where the vehicle actually travels. For example, when there is a large discrepancy between the acquired recommended speed and the actually preferred speed, speed control different from movement of a surrounding vehicle may be performed such that the vehicle suddenly decreases in speed even though a vehicle traveling ahead does not change in speed, for example. The speed control different from the movement of the surrounding vehicle is not assumed by a driver of the vehicle, and thus may give the driver a sense of incongruity.

The present invention is made in light of the above circumstances, and an object of the present invention is to provide a technique capable of reducing speed control that gives a sense of incongruity to a driver of a vehicle when speed of the vehicle is controlled in accordance with a recommended speed.

Solution to Problem

To achieve the above object, a vehicle control device according to one aspect is configured to control traveling of a vehicle including a recommended speed acquisition unit capable of acquiring recommended speeds for the vehicle in accordance with traffic conditions in a plurality of sections, the vehicle control device including: a determination unit that determines a magnitude relationship between a first recommended speed in a first section where the vehicle currently travels, and a second recommended speed in a second section extending from the first section in a traveling direction of the vehicle, among the recommended speeds acquired by the recommended speed acquisition unit; and a speed control unit that performs speed control of the vehicle in accordance with the magnitude relationship between the first recommended speed and the second recommended speed determined by the determination unit.

Advantageous Effects of Invention

According to the present invention, when speed of a vehicle is controlled in accordance with a recommended speed, speed control giving a driver of the vehicle a sense of incongruity can be reduced.

DESCRIPTION OF EMBODIMENTS

Embodiments will be described with reference to the drawings. The embodiments described below do not limit the invention according to the scope of claims, and all elements and combinations described in the embodiments are not necessarily required for the solution of the invention.

First Embodiment

Figure 1:
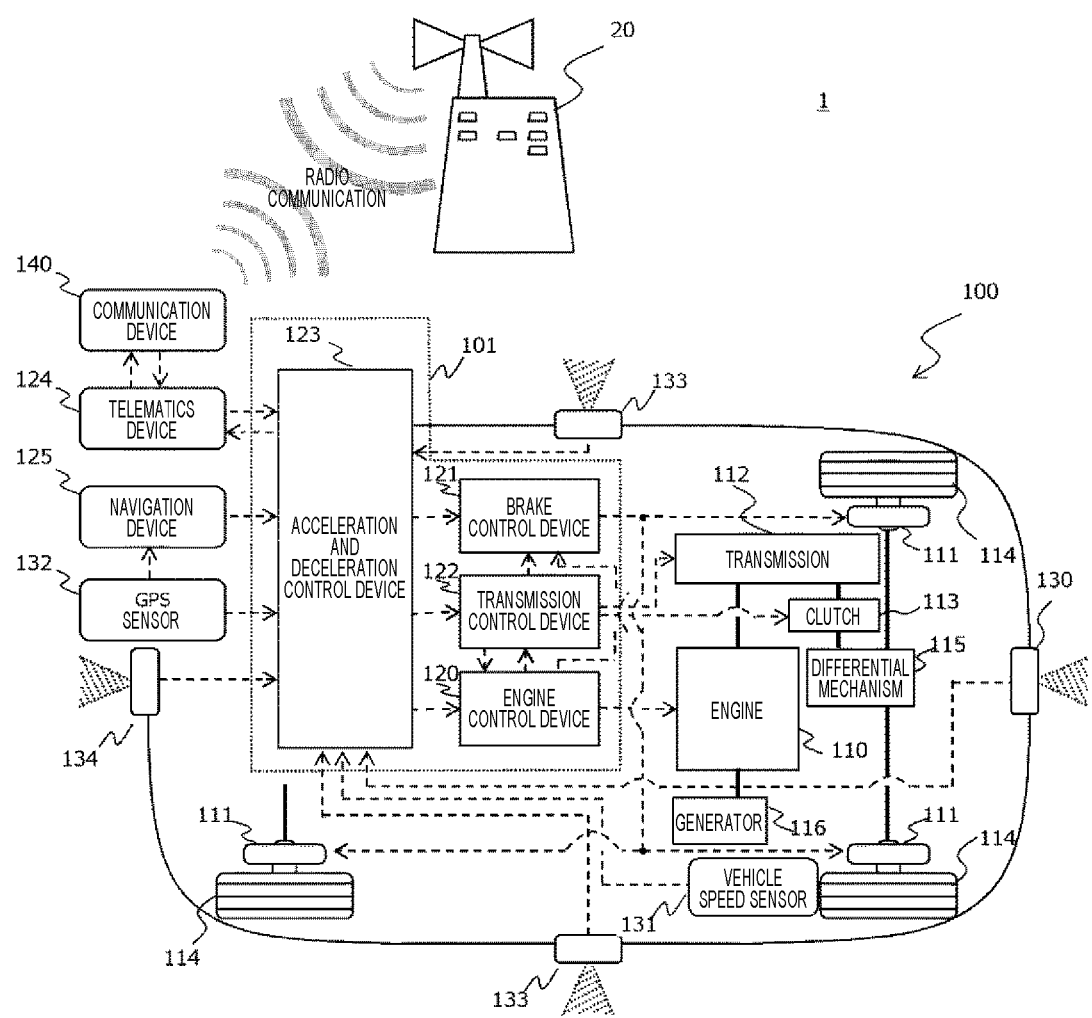
FIG. 1 is a general configuration diagram of a vehicle control system according to a first embodiment.

FIG. 1 is a general configuration diagram of a vehicle control system according to a first embodiment.

The vehicle control system 1 includes a data center 20 and one or more vehicles 100. The data center 20 transmits and receives information to or from the vehicle 100 or the like. For example, the data center 20 transmits recommended speed information including recommended speeds suitable for traffic conditions in one or more sections in a route of the vehicle 100 to the vehicle 100.

The vehicle 100 includes an engine 110 as an example of a drive source, a plurality of wheels 114, each brake 111, a transmission 112, a clutch 113, a differential mechanism 115, a vehicle control device 101, a front recognition sensor 130, a rear recognition sensor 134, a vehicle speed sensor 131, a GPS sensor 132, a communication device 140, a telematics device 124 as an example of the recommended speed acquisition unit, and a navigation device 125. The vehicle control device 101 includes an engine control device 120, a brake control device 121, a transmission control device 122, and an acceleration and deceleration control device 123.

The engine 110 converts chemical energy of fuel into power (driving force) by burning fuel such as gasoline.

The brake 111 is disposed in the vicinity of each wheel 114, for each wheel 114, and generates a braking force for braking the vehicle 100. Specifically, the brake 111 includes a brake disc provided to rotate with the wheel 114, a friction body provided facing a sliding surface of the brake disc, and a pressing mechanism that presses the friction body against the sliding surface of the brake disc using hydraulic pressure of supplied brake oil. When the pressure of the brake oil supplied to the pressing mechanism increases in the brake 111, the pressing mechanism presses the friction body against the sliding surface of the brake disc, and converts the rotational force of the brake disc into friction energy. Then, a braking force for braking the vehicle 100 is generated.

The transmission 112 shifts a driving force transmitted from the engine 110 and transmits it to the subsequent stage. The transmission 112 includes a winding transmission mechanism that has at least two sets of cones with apexes facing each other using hydraulic pressure, the cones having respective winding portions each with a diameter variable by adjusting an interval between the cones, the diameter of each of the winding portions in each of the two sets is controlled to acquire a desired reduction ratio. The transmission 112 is not limited to a continuously variable transmission having the winding transmission mechanism, and may be a manual transmission having a plurality of gear stages, or an automatic transmission that automatically shifts a plurality of gear stages, for example.

The clutch 113 transmits and interrupts (connects and disconnects) a driving force between the transmission 112 and a driving wheel of the wheels 114. The differential mechanism 115 transmits an input driving force to left and right drive wheels so that the left and right drive wheels can be differentially rotated.

The front recognition sensor 130 is a stereo camera, a radar sensor, or the like, for example, detects an object (such as a vehicle) ahead of the vehicle 100, and measures a distance from the object. The rear recognition sensor 134 is a stereo camera, a radar sensor, or the like, for example, detects an object (such as a vehicle) behind the vehicle 100, and measures a distance from the object.

The vehicle speed sensor 131 detects speed (vehicle speed) of the vehicle 100. The vehicle speed sensor 131 may be a wheel speed sensor that detects rotational speed of the wheel 114, for example. The vehicle speed can be detected from the rotational speed of the wheel 114 with a predetermined calculation formula.

The GPS sensor 132 detects location information on the vehicle 100. The communication device 140 communicates with the data center 200. The telematics device 124 transmits and receives various kinds of information to or from the data center 200 via the communication device 140. The telematics device 124 acquires various kinds of information (e.g., a recommended speed of one or more sections on a road of the vehicle 100) from the data center 200. The navigation device 125 identifies a location of the vehicle 100 (vehicle location) in accordance with the location information (signal) detected by the GPS sensor 132, and outputs a speed limit of a route, the curve passing speed, and the like to a display device along with surrounding map information. For example, the navigation device 125 may receive surrounding information and determine a recommended speed of a section on the road of the vehicle 100.

The vehicle 100 is configured such that a driving force generated by the engine 110 is transmitted to the transmission 112, and after being shifted by the transmission 112, is transmitted to the left and right wheels 114 via the clutch 113 and the differential mechanism 115. Accordingly, the wheels 114 are rotationally driven to allow the vehicle 100 to travel.

The engine control device 120 controls a throttle body, a fuel injector, an ignition device, and the like, which are not shown, so that the engine 110 generates a desired driving force. The engine control device 120 includes: an arithmetic device (processor) that executes various programs necessary for controlling the engine 110; a primary storage device that holds an arithmetic process and an arithmetic result; a secondary storage device that stores a program and various control constants; an I/O port for transmitting a command to the throttle body, the fuel injector, the ignition device attached to the engine 110, and communicating with various control devices including the acceleration and deceleration control device 123; and an A/D converter for taking in a measured value (vehicle speed) acquired by the vehicle speed sensor 131, a measured value (air amount) acquired by an air flow meter (not illustrated) for measuring the amount of air taken into the engine 110, and the like. The engine control device 120 executes a program to change the amount of intake air and the amount of fuel injection so that the engine 110 generates a desired driving force. The engine 110 converts chemical energy of fuel into heat energy by combustion and expands air taken into the engine 110 to generate a force using pressure of the air so that the force pushing down a piston is converted into a rotational force by a crank mechanism to obtain a driving force. Thus, the engine 110 can be controlled to a desired power state by changing the amount of intake air and the amount of fuel injection.

The brake control device 121 controls a braking force generated by the brake 111 by controlling hydraulic pressure of brake oil supplied to the brake 111. The brake control device 121 includes an arithmetic device, a primary storage device, a secondary storage device, an I/O port, an A/D converter, and the like.

The transmission control device 122 adjusts a change gear ratio of the transmission 112 and controls connection and disconnection of a driving force of the clutch 113. The transmission control device 122 includes an arithmetic device, a primary storage device, a secondary storage device, an I/O port, an A/D converter, and the like.

The acceleration and deceleration control device 123 is an example of a determination unit and a speed control unit, and commands operation of the engine control device 120, the brake control device 121, and the transmission control device 122, in accordance with sensor information received from various sensors, to control acceleration and deceleration of the vehicle 100. The acceleration and deceleration control device 123 includes an arithmetic device, a primary storage device, a secondary storage device, an I/O port, an A/D converter, and the like.

The acceleration and deceleration control device 123 outputs a command to control the engine control device 120, the brake control device 121, and the transmission control device 122 in accordance with the recognition information of the front recognition sensor 130 and a vehicle speed (speed signal) from the vehicle speed sensor 131. For example, the acceleration and deceleration control device 123 outputs a command to decelerate the vehicle 100 (command to increase a braking force) when an inter-vehicle distance from a preceding vehicle detected by the front recognition sensor 130 is reduced. In addition, the acceleration and deceleration control device 123 outputs a command to accelerate the vehicle 100 to a predetermined speed when a distance from a preceding vehicle detected by the front recognition sensor 130 is increased or when no preceding vehicle exists. When the commands are output as described above, travel of the vehicle 100 can be controlled in accordance with a speed of a preceding vehicle by preventing the vehicle 100 from being too close to the preceding vehicle.

Figure 2:
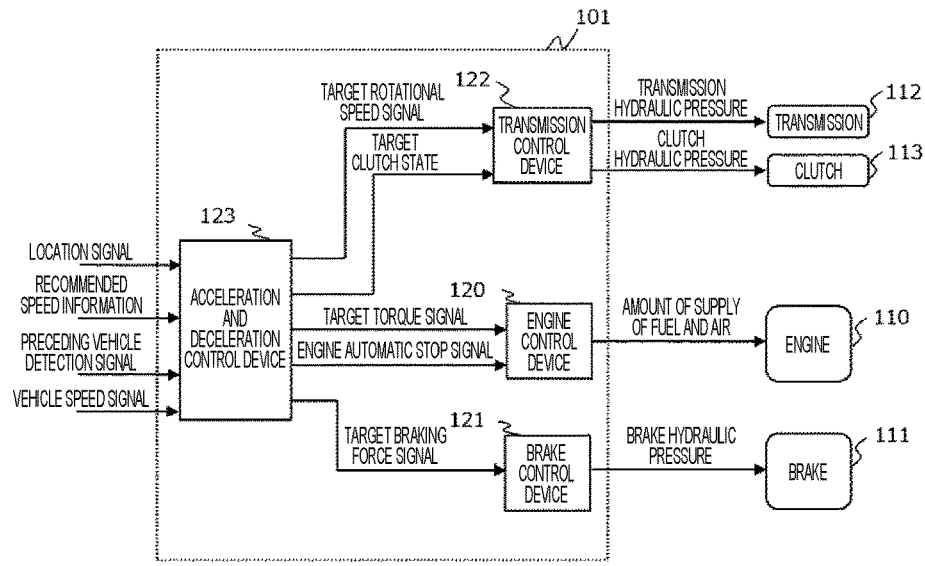
FIG. 2 is a configuration diagram of a vehicle control device according to the first embodiment.

FIG. 2 is a configuration diagram of a vehicle control device according to the first embodiment.

The vehicle control device 101 includes the acceleration and deceleration control device 123, the engine control device 120, the brake control device 121, and the transmission control device 122. The vehicle control device 101 controls the engine 110, the brake 111, the transmission 112, and the clutch 113.

The acceleration and deceleration control device 123 calculates a target torque signal indicating a target value of torque output from the engine 110, an engine automatic stop signal output for stopping the engine 110, a target rotational speed signal indicating a target value of rotational speed of the engine 110, a target clutch state indicating a target state (a disconnection state or a connection state) to which the clutch 113 is controlled, and a target braking force signal indicating a target value of a braking force generated by the brake 111, in accordance with a preceding vehicle detection signal received from the front recognition sensor 130, a vehicle speed signal received from the vehicle speed sensor 131, a location signal received from the GPS sensor 132, and recommended speed information received via the communication device 140 and the telematics device 124. The acceleration and deceleration control device 123 outputs the target rotational speed signal and the target clutch state obtained by the calculation to the transmission control device 122. The acceleration and deceleration control device 123 also outputs the target torque signal and the engine automatic stop signal obtained by the calculation to the engine control device 120. In addition, the acceleration and deceleration control device 123 outputs the target braking force signal to the brake control device 121.

The engine control device 120 calculates and outputs a fuel-air supply amount signal that commands the amount of supply of fuel and air to the engine 110 in accordance with the target torque signal received from the acceleration and deceleration control device 123. Accordingly, torque generated by the engine 110 and rotational speed of the engine 110 can be controlled.

In addition, the engine control device 120 performs control to stop the engine 110 in an appropriate sequence when receiving the engine automatic stop signal from the acceleration and deceleration control device 123. For example, the engine control device 120 performs a sequence such as: controlling such that ignition is stopped after fuel supply is stopped; stopping the engine 110 generating a driving force by minimizing a target amount of air and closing a throttle valve, for example; and stopping rotation of the engine 110 with rotation resistance of the engine 110 itself.

The transmission control device 122 calculates and outputs a transmission hydraulic pressure signal to command hydraulic pressure to be supplied to the transmission 112, and a clutch hydraulic pressure signal to command hydraulic pressure to be supplied to the clutch 113, in accordance with the target rotational speed signal and the target clutch state received from the acceleration and deceleration control device 123. Accordingly, the gear change ratio of the transmission 112, i.e., the rotational speed of the engine 110, and a power transmission state of the clutch 113, can be controlled.

The brake control device 121 calculates and outputs a brake hydraulic pressure signal to command hydraulic pressure to be supplied to the brake 111 in accordance with the target braking force signal received from the acceleration and deceleration control device 123. Accordingly, a braking force generated by the brake 111 can be controlled.

In the present embodiment, the acceleration and deceleration control device 123 can automatically control speed of the vehicle 100 with any one of recommended speed control and front vehicle corresponding control.

The recommended speed control (predetermined speed control) is performed to maintain speed of the vehicle 100 at a predetermined target speed (e.g., a recommended speed). The recommended speed control is performed when an inter-vehicle distance (or inter-vehicle time or collision margin time) between the vehicle 100 (the own vehicle) and a preceding vehicle is a predetermined value or more. When the inter-vehicle distance (or inter-vehicle time or collision margin time) is less than the predetermined value, the front vehicle corresponding control is performed.

The recommended speed control is performed such that the acceleration and deceleration control device 123 allows traveling speed of the vehicle 100 (i.e., the vehicle speed signal) to match a recommended speed in the recommended speed information, for example, in accordance with the recommended speed included in the recommended speed information and the vehicle speed signal. For example, when the vehicle speed signal indicates a speed less than the recommended speed, the acceleration and deceleration control device 123 increases the driving force of the engine 110, i.e., corrects the target torque signal to be output to the engine control device 120 in an increasing direction. On the other hand, when the vehicle speed signal indicates a speed more than the recommended speed, a braking force of the vehicle 100 is increased, i.e., the target torque signal to be output to the engine control device 120 is corrected in a decreasing direction, and the target braking force signal to be output to the brake control device 121 is corrected in an increasing direction as necessary.

According to the recommended speed control, no fuel is supplied to the engine 110 to increase the speed of the vehicle 100 to more than the target speed, and no braking is performed by the brake 111 to decrease the speed of the vehicle 100 to less than the target speed more than necessary, so that wasteful fuel consumption can be reduced.

The front vehicle corresponding control is performed such that while the acceleration and deceleration control device 123 commands a braking force to increase when an inter-vehicle distance from a preceding vehicle is reduced, the acceleration and deceleration control device 123 commands a driving force to increase when the inter-vehicle distance from the preceding vehicle is increased. This kind of control enables the vehicle 100 to travel in accordance with a traveling state of the preceding vehicle, and by extension, surrounding traffic conditions (traffic flow).

The recommended speed control and the front vehicle corresponding control are automatically performed while respecting an intention of a driver of the vehicle 100. Thus, it can be determined whether to perform the recommended speed control and the front vehicle corresponding control in accordance with the intention of the driver. For example, the driver of the vehicle 100 can permit performance of these controls by performing a predetermined driving operation such as turning on a switch (not illustrated). The driver can prohibit performance of these controls by turning off the switch, or operating a brake or an accelerator pedal. When such an operation is performed, the acceleration and deceleration control device 123 receives an override by an operation instruction from the driver, and performs acceleration and deceleration control in accordance with the operation by the driver.

FIG. 3 is a graph illustrating a relationship between a recommended speed and a braking and driving force, and control ranges of recommended speed control and front vehicle corresponding control.

Figure 3A:
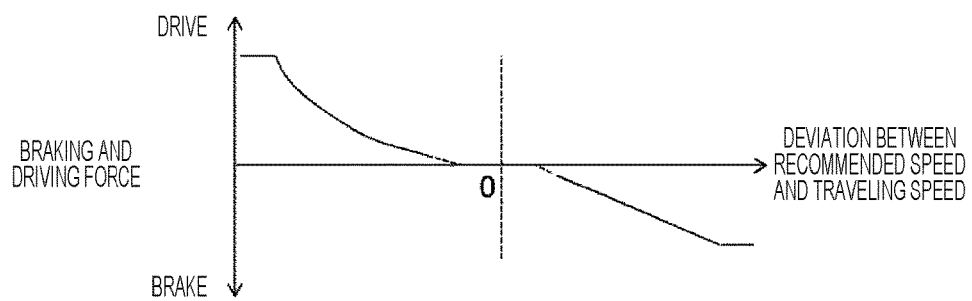
FIGS. 3A and 3B are graphs illustrating a relationship between a recommended speed and a braking and driving force, and control ranges of recommended speed control and front vehicle corresponding control.

FIG. 3(a) shows the relationship between a braking or driving force, and deviation between recommended speed and traveling speed, when a target speed is defined as the recommended speed in the recommended speed control.

In the recommended speed control, the braking force or the driving force increases as the deviation from the target recommended speed increases. In the recommended speed control, when the deviation is positive and large, i.e., when the traveling speed is larger than the recommended speed, the vehicle 110 is decelerated by generating a large braking force. On the other hand, when the deviation is negative and large, i.e., when the traveling speed is small relative to the recommended speed, the vehicle 100 is accelerated by generating a large driving force.

Figure 3B:
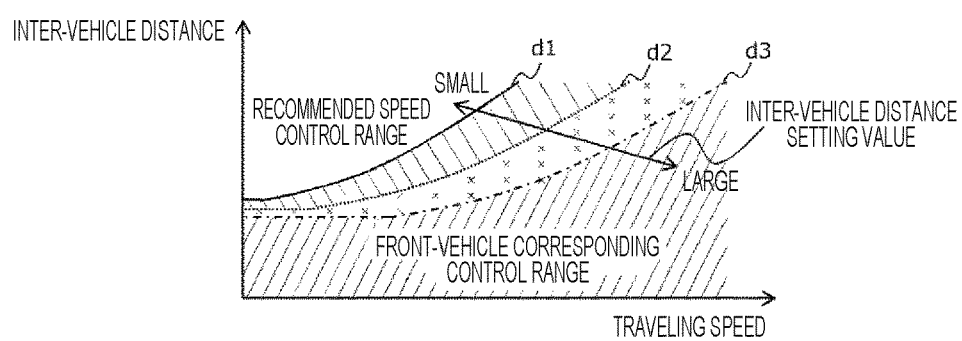

FIG. 3(b) shows a relationship between inter-vehicle distance and traveling speed when the front vehicle corresponding control shifts to the recommended speed control. FIG. 3(b) shows boundary lines d1, d2, and d3 across which the front vehicle corresponding control shifts to the recommended speed control for respective different setting values of the target inter-vehicle distances to be targeted (target inter-vehicle distances) in the front vehicle corresponding control selected by the driver.

The boundary line d1 is for a small setting value of the inter-vehicle distance in the front vehicle corresponding control, i.e., for setting of the shortest inter-vehicle distance from a preceding vehicle, the boundary line d2 is for a slightly longer setting value of the inter-vehicle distance in the front vehicle corresponding control, and the boundary line d3 is for the longest setting value of the inter-vehicle distance in the front vehicle corresponding control.

Each of the setting values of the inter-vehicle distance in the front vehicle corresponding control is set such that as the traveling speed of the vehicle 100 increases, the inter-vehicle distance for shifting from the front vehicle corresponding control to the recommended speed control increases and a region where the front vehicle corresponding control is performed (hatching and shaded portions in the drawing) expands. In addition, each of the setting values is set such that as the setting value of the inter-vehicle distance in the front vehicle corresponding control decreases, the inter-vehicle distance for shifting from the front vehicle corresponding control to the recommended speed control increases as shown in the boundary lines d3, d2, and d1 and a region where the front vehicle corresponding control is performed expands.

The boundary line across which the front vehicle corresponding control shifts to the recommended speed control is not limited to that shown in FIG. 3(b). For example, the boundary line may include a section where the inter-vehicle distance monotonously increases with respect to the traveling speed, and a section where the inter-vehicle distance is constant regardless of the traveling speed.

FIG. 4 is a graph illustrating an inter-vehicle distance setting value, and a relationship between the inter-vehicle distance setting value and braking and driving force, according to the first embodiment.

Figure 4A:
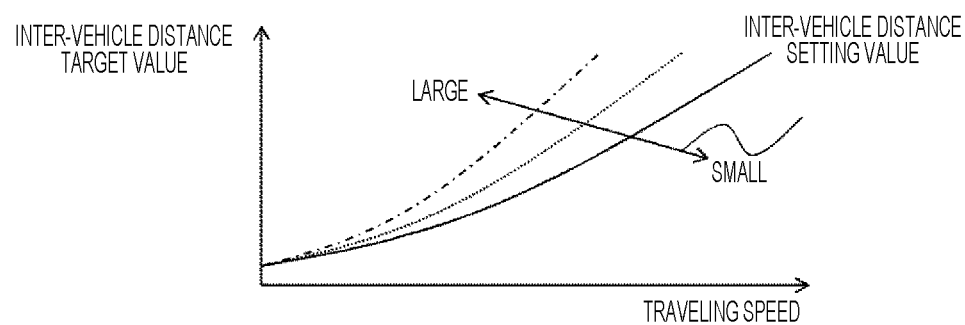
FIGS. 4A and 4B are graphs illustrating an inter-vehicle distance setting value, and a relationship between the inter-vehicle distance setting value and braking and driving force, according to the first embodiment.

FIG. 4(a) shows a relationship between traveling speed in the front vehicle corresponding control and a setting value of the target inter-vehicle distance in the front vehicle corresponding control. FIG. 4(a) shows lines for three patterns with different inter-vehicle distance setting values. In FIG. 4(a), the line corresponding to the pattern with a larger inter-vehicle distance setting value is located further in an upper left direction in the drawing. The driver can select which inter-vehicle distance setting value is set by operating a switch or the like (not illustrated). While in FIG. 4(a), the three patterns are shown as the setting of the inter-vehicle distance setting value, two patterns, or four or more patterns may be used, for example.

Figure 4B:
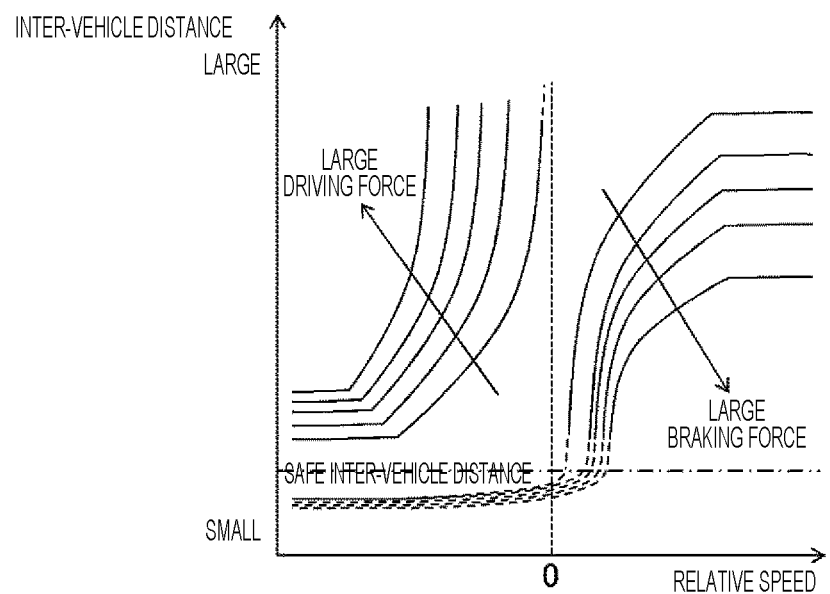

FIG. 4(b) shows change in a braking force and a driving force that are generated for relative speed (speed difference) to the preceding vehicle and an inter-vehicle distance, in the front vehicle corresponding control. FIG. 4(b) shows lines each indicating a boundary for each magnitude of the braking force and the driving force, and the driving force increases toward a region upper left in the drawing, and the braking force increases toward a region lower right in the drawing.

The front vehicle corresponding control is performed such that as relative speed being positive increases, i.e., as speed of an own vehicle increases more than that of a preceding vehicle, and as an inter-vehicle distance decreases, a larger braking force is generated, and on the other hand, as relative speed being negative increases, i.e., as speed of the own vehicle decreases less than that of the preceding vehicle, and as an inter-vehicle distance increases, a larger driving force is generated. When the inter-vehicle distance cannot be secured sufficiently and is less than a safe inter-vehicle distance shown in FIG. 4(b), the braking force is generated even when the relative speed is negative. Performing as described above enables avoiding a collision with the preceding vehicle or reducing damage when a collision occurs.

While FIGS. 3(b) and 4(a) each illustrate using the inter-vehicle distance, an amount having a predetermined relationship with the inter-vehicle distance, such as inter-vehicle time, may be used instead of the inter-vehicle distance.

For example, when the inter-vehicle distance is used for setting as shown in FIG. 4(a), the inter-vehicle distance to be set as a target may be set as follows: for a traveling speed of 0 km/h that means an inter-vehicle distance at a stop, a value within the range of from 1 m to 5 m, such as 2 m or 3 m, is set; for a traveling speed of 20 km/h, a value of from 20 m to 30 m is set; for a speed of 60 km/h, a value of from 25 m to 40 m is set; and for a speed of 100 km/h, a value of from 40 m to 70 m is set, for example, thereby causing the target inter-vehicle distance to increase monotonically as the speed increases.

In addition, when the inter-vehicle time is used for setting instead of the inter-vehicle distance, the inter-vehicle time corresponding to each traveling speed may be set to a value within the range of from 0.8 seconds to 3.0 seconds, and more preferably set to a value within the range of from 1.2 seconds to 2.2 seconds corresponding to a braking time when a vehicle is stopped after braking operation of a person, for example.

In the front vehicle corresponding control, the acceleration and deceleration control device 123 outputs a command of a braking or driving force to the engine control device 120, the brake control device 121, and the transmission control device 122, using a preceding vehicle detection signal received from the front recognition sensor 130 and a speed signal from the vehicle speed sensor 131.

The acceleration and deceleration control device 123 outputs a command for deceleration (command to increase a braking force) when the inter-vehicle distance from the preceding vehicle detected by the front recognition sensor 130 is reduced. On the other hand, the acceleration and deceleration control device 123 outputs a command for acceleration (command to increase a driving force) to cause the inter-vehicle distance from the preceding vehicle to be close to the inter-vehicle distance setting value when the inter-vehicle distance from the preceding vehicle detected by the front recognition sensor 130 is increased. Then, when the inter-vehicle distance detected by the front recognition sensor 130 exceeds the predetermined inter-vehicle distance (switching inter-vehicle distance) for switching from the front vehicle corresponding control to the recommended speed control, or when the preceding vehicle cannot be recognized, the acceleration and deceleration control device 123 switches the front vehicle corresponding control to the recommended speed control.

According to the front vehicle corresponding control, travelling control of the vehicle 100 can be performed in accordance with a surrounding vehicle without being too close to the preceding vehicle, so that a psychological burden on the driver of the vehicle 110 can be reduced.

Figure 5:
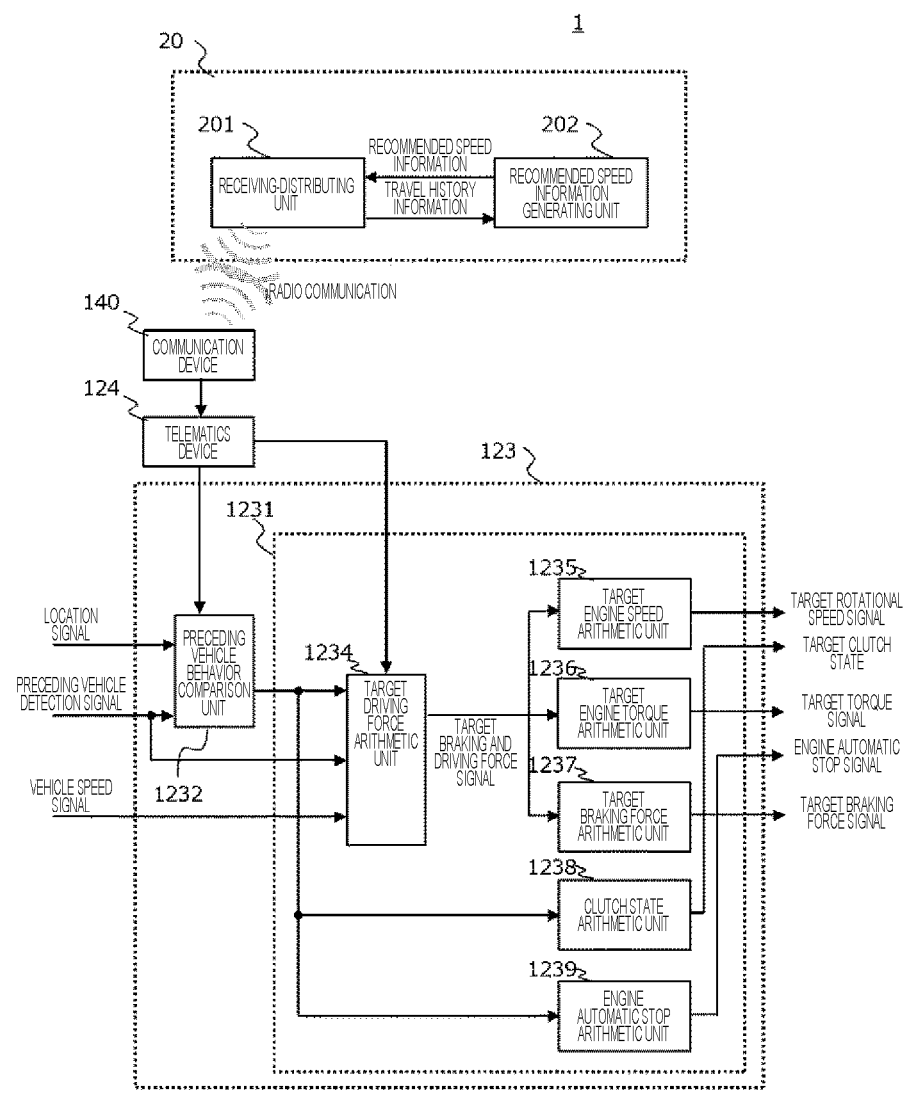
FIG. 5 is a configuration diagram of a part of the vehicle control system including an acceleration and deceleration control device, according to the first embodiment.

FIG. 5 is a configuration diagram of a part of the vehicle control system including an acceleration and deceleration control device, according to the first embodiment.

The data center 20 of the vehicle control system 1 includes a receiving-distributing unit 201 and a recommended speed information generating unit 202. The receiving-distributing unit 201 transmits and receives data to or from the vehicle 100. The recommended speed information generation unit 202 calculates recommended speeds in a section where the vehicle 100 travels and in a subsequent section in accordance with travel history information (location information of the vehicle 100, etc.) received from the vehicle 100 via the receiving-distributing unit 201, and distributes recommended speed information including the recommended speeds to the vehicle 100 via the receiving-distributing unit 201. The recommended speed included in the recommended speed information is a travelling speed suitable for a traffic flow, for example, i.e., a travelling speed in accordance with (suitable for) a degree of congestion of the route of the vehicle 100. Then, as the degree of congestion of the route increases, i.e., as the number of vehicles traveling on the same route increases, the recommended speed decreases, and as the degree of congestion of the route decreases, i.e., as the number of vehicles traveling on the same route decreases, the recommended speed increases.

Here, a calculation method for calculating the recommended speed will be described.

The recommended speed Vrecommend may be calculated using Expression (1) by obtaining travel time of a certain section of the route from a traffic information service such as VICS (registered trademark), for example, and using the acquired travel time of the section and a length of the section.

[Expression 1]

$$V_{recommend} = \frac{D_{link}}{t_{travel}} \quad (1)$$

$D_{link}$ Section length $t_{travel}$ Travel time of section

Alternatively, the recommended speed may be obtained by acquiring speeds of a plurality of vehicles preceding the vehicle 100 on the target route by communication, and averaging the speeds of the vehicles.

In addition, the recommended speed may be obtained by acquiring speeds of a plurality of vehicles preceding the vehicle 100 on the target route by communication, and performing statistical processing such as increasing a weight of a low speed on the speeds acquired by the communication (e.g., processing shown in Expression (2)).

[Expression 2]

$$m_i = c(V_{max} - V_i)^2 \quad (2)$$
$$W_i = \frac{m_i}{\sum_{i=1}^{n} m_i}$$
$$1 = \sum_{i=1}^{n} W_i$$
$$V_{recommend} = \begin{pmatrix} W_1 \\ W_2 \\ \vdots \\ W_n \end{pmatrix}^T \begin{pmatrix} V_1 \\ V_2 \\ \vdots \\ V_n \end{pmatrix}$$

$m_i$ Weight parameter
$c$ Adjusting parameter
$W_i$ Weight coefficient
$V_i$ Speed acquired by communication
$n$ Number of vehicles that can be communicated
$V_{max}$ Maximum value of speed acquired by communication Further, speeds of a plurality of vehicles preceding the vehicle 100 on the target route is acquired by communication, and the speeds obtained by the communication is sorted to calculate a quantile so that a speed within the range of from 85% to 90% of a total of the speeds may be defined as the recommended speed.

The recommended speed Vrecommend also may be calculated using Underwood's expression shown in Expression (3) by estimating traffic density using a section length of a section on the route of the vehicle 100, a presence ratio of vehicles that can communicate, and the number of vehicles existing on the route that can communicate.

[Expression 3]

$$k_{est} = \frac{d - \frac{n_{cv}}{p_{cv}} \cdot L_v}{\frac{n_{cv}}{p_{cv}}} \quad (3)$$
$$V_{recommed} = V_f e^{-k/k_c}$$

$d$ Section length
$k_{est}$ Estimated value of traffic density
$n_{cv}$ Number of vehicles having been communicated
$p_{cv}$ Existence ratio of vehicles that can be communicated
$L_v$ Average vehicle length
$v_f$ Free speed
$k_c$ Saturation traffic density Instead of Expression (3), the recommended speed may be calculated using an expression such as Greenshields, Greenberg, Drake, Drew, or Munjal-Pipes.

In addition, the recommended speed may be a speed of regulation speed or a legal speed in the section. Alternatively, travel performance of vehicles traveling on the same route may be collected so that the travel performance is subjected to statistical processing to calculate the recommended speed.

While in the above description, the recommended speed information generation unit 202 of the data center 200 calculates the recommended speed, the present invention is not limited to this. For example, information required to calculate the recommended speed with the communication device 140 is acquired on a vehicle 10 side, and the recommended speed may be calculated in accordance with the information acquired by the configuration in the vehicle 10 (e.g., the telematics device 124).

The acceleration and deceleration control device 123 includes a control unit 1231 and a preceding vehicle behavior comparison unit 1232. The control unit 1231 includes a target braking-driving force arithmetic unit 1234, a target engine speed arithmetic unit 1235, a target engine torque arithmetic unit 1236, a target braking force arithmetic unit 1237, a clutch state arithmetic unit 1238, and an engine automatic stop arithmetic unit 1239.

The preceding vehicle behavior comparison unit 1232 acquires the recommended speed information distributed from the receiving-distributing unit 201 via the communication device 140 and the telematics device 124, and compares it with the preceding vehicle detection signal. Then, comparison results are output to the target braking-driving force arithmetic unit 1234, the clutch state arithmetic unit 1238, and the engine automatic stop arithmetic unit 1239. Here, the preceding vehicle behavior comparison unit 1232 compares the recommended speed in the recommended speed information with the speed of the preceding vehicle obtained as the preceding vehicle detection signal.

The target braking-driving force arithmetic unit 1234 generates a target braking-driving force signal in accordance with the comparison result of the preceding vehicle behavior comparison unit 1232, the preceding vehicle detection signal, and the vehicle speed signal from the vehicle speed sensor 131, and then outputs the target braking-driving force signal to the target engine speed arithmetic unit 1235, the target engine torque arithmetic unit 1236, and the target braking force arithmetic unit 1237.

The target engine speed arithmetic unit 1235 outputs a target rotational speed signal in accordance with the received target braking-driving force signal. The target engine torque arithmetic unit 1236 outputs a target torque signal in accordance with the received target braking-driving force signal. The target braking force arithmetic unit 1237 outputs a target braking force signal in accordance with the received target braking-driving force signal. The clutch state arithmetic unit 1238 calculates a target clutch state in accordance with the received comparison result, and outputs the target clutch state. The engine automatic stop arithmetic unit 1239 determines engine stop in accordance with the received comparison result, and outputs an engine automatic stop signal.

Next, vehicle speed control processing using the vehicle control device 101 according to the first embodiment will be described.

Figure 8:
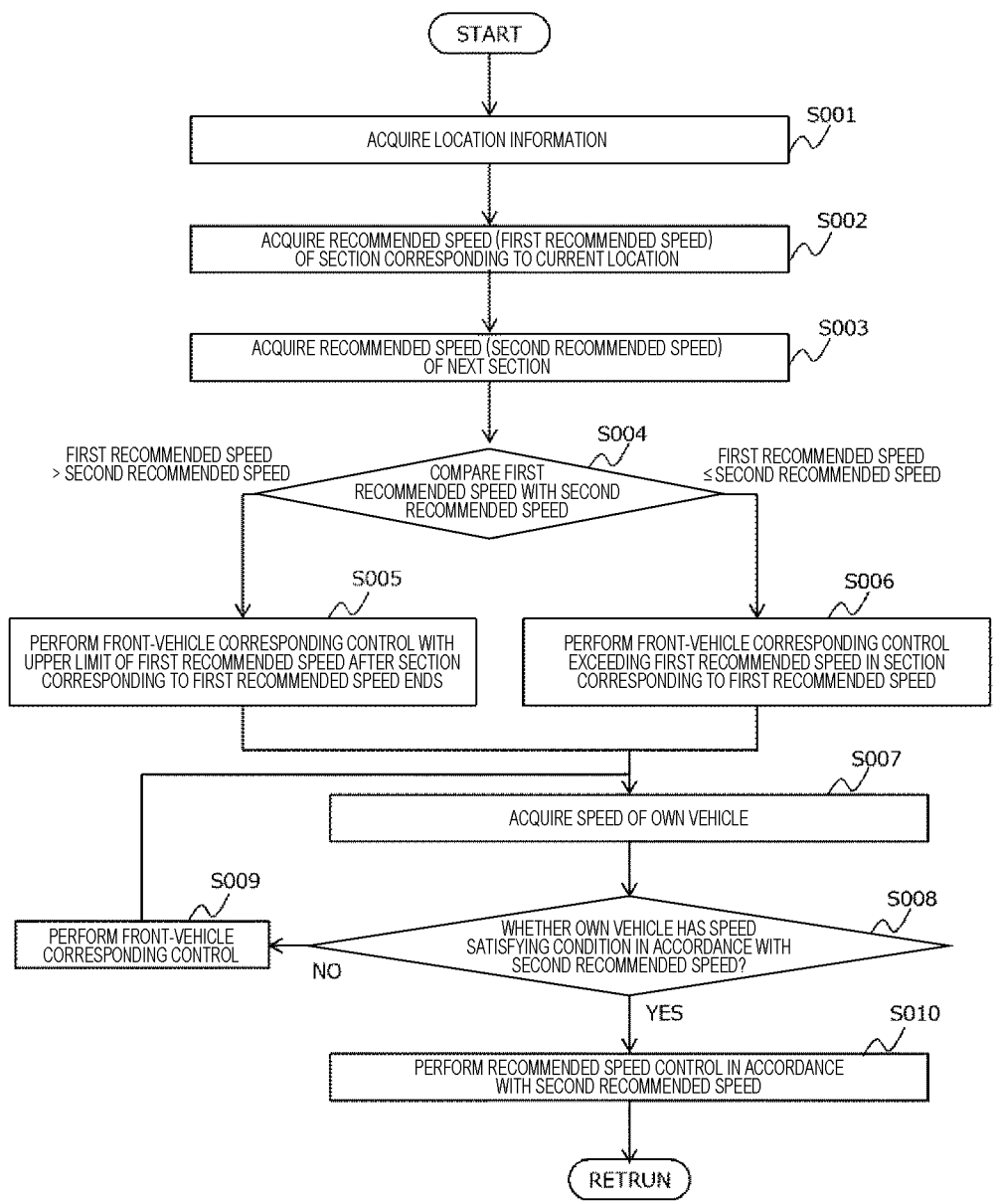
FIG. 8 is a flowchart of vehicle speed control processing according to the first embodiment.

FIG. 8 is a flowchart of vehicle speed control processing according to the first embodiment.

The acceleration and deceleration control device 123 of the vehicle control device 101 acquires current location information on the vehicle 100 (own vehicle) from the GPS sensor 132 mounted in the vehicle 100 (step S001).

Next, the acceleration and deceleration control device 123 acquires a recommended speed (first recommended speed) for a section (first section: current section) corresponding to the current location information from the telematics device 124 (step S002). The acceleration and deceleration control device 123 also acquires a recommended speed (second recommended) corresponding to the next section (second section: next section) in the route (traveling direction) of the vehicle 100 in the section corresponding to the current location from the telematics device 124 (step S003).

Next, the acceleration and deceleration control device 123 compares the first recommended speed with the second recommended speed (step S004). As a result, when the first recommended speed is more than the second recommended speed, the acceleration and deceleration control device 123 starts speed control of the vehicle 100 in which the first recommended speed is defined as the upper limit speed after the section corresponding to the first recommended speed is finished (step S005). For example, when the inter-vehicle distance from the preceding vehicle is within a range of inter-vehicle distances for performing the front vehicle corresponding control, the acceleration and deceleration control device 123 starts the front vehicle corresponding control with the upper limit of the first recommended speed.

On the other hand, when the first recommended speed is equal to or less than the second recommended speed, the acceleration and deceleration control device 123 performs speed control such that the speed of the vehicle 100 is increased to a speed exceeding the first recommended speed (e.g., the second recommended speed as the upper limit) within the section corresponding to the first recommended speed (step S006). For example, when the inter-vehicle distance from the preceding vehicle is within the range of inter-vehicle distances for performing the front vehicle corresponding control, the acceleration and deceleration control device 123 starts the front vehicle corresponding control with the upper limit of the second recommended speed.

After performing step S005 or step S006, the acceleration and deceleration control device 123 acquires the speed of the own vehicle (step S007), and determines whether a predetermined condition in accordance with the second recommended speed is satisfied (step S008). As a result, when it is determined that the predetermined condition in accordance with the second recommended speed is not satisfied (NO at step S008), the acceleration and deceleration control device 123 continuously performs the speed control in step S005 or step S006 (step S009) to allow the processing to proceed to step S007. On the other hand, when it is determined that the predetermined condition in accordance with the second recommended speed is satisfied (YES at step S008), the acceleration and deceleration control device 123 performs speed control in accordance with the second recommended speed (step S010). For example, when an inter-vehicle distance from the preceding vehicle exceeds the range of inter-vehicle distances for performing the front vehicle corresponding control, the acceleration and deceleration control device 123 performs the recommended speed control in accordance with the second recommended speed. Accordingly, the vehicle 100 travels at the second recommended speed or a speed close thereto in the next section.

Here, the predetermined condition in accordance with the second recommended speed is a condition for finishing the speed control in step S005 or step S006. For example, when the speed control in step S005 is performed (the first recommended speed is higher than the second recommended speed), the speed of the vehicle 100 may decrease to less than the second recommended speed, and the speed of the vehicle 100 may start to increase after it is detected that the speed of the vehicle 100 has decreased to less than the second recommended speed. When the speed control instep S006 is performed (when the first recommended speed is equal to or less than the second recommended speed), the speed of the vehicle 100 may increase to more than the second recommended speed, and the speed of the vehicle 100 may start to decrease after the speed of the vehicle 100 increases to more than the second recommended speed.

As another condition, when the first recommended speed is higher than the second recommended speed, the speed of the own vehicle may decrease to less than the second recommended speed for a predetermined time (2 seconds to 5 seconds, 10 seconds, etc.). When the first recommended speed is equal to or less than the second recommended speed, the speed of the own vehicle may increase to more than the second recommended speed for a predetermined time (2 seconds to 5 seconds, 10 seconds, etc.). Instead of only a condition that the speed of the vehicle 100 decreases to less than the second recommended speed (or increases to higher than the second recommended speed), combining an additional condition with the condition enables preventing the control in step S005 or step S006 from being terminated due to temporal decrease in the speed of the vehicle 100 to less than the second recommended speed without following a traffic flow (or temporal increase to higher than the second recommended speed) such as deceleration to travel along a curve in a section, or the like. Thus, the speed control of the vehicle 100 more along the traffic flow can be appropriately continued.

For describing effect of the vehicle speed control according to the first embodiment, first, a comparative example in which vehicle speed control for causing speed to follow a recommended speed in a section is performed for each section will be described.

Figure 6A:
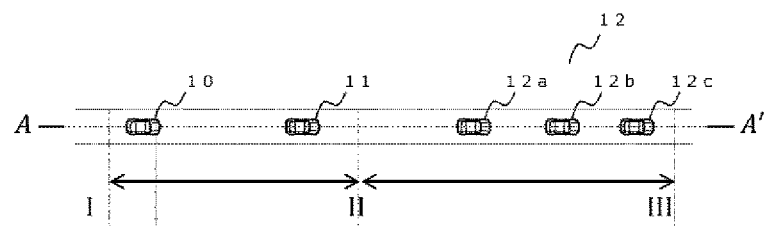
FIGS. 6A to 6C are graphs illustrating vehicle speed control according to a comparative example when a recommended speed is reduced in a next section.
Figure 6B:
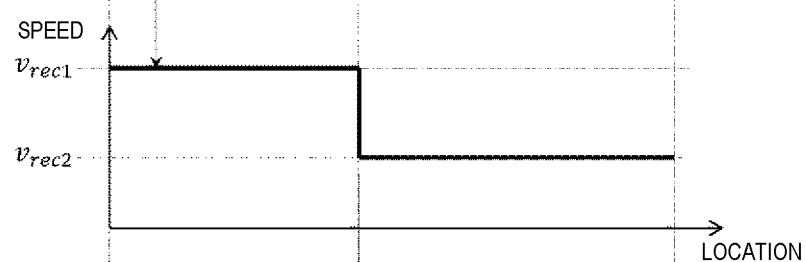

FIG. 6 is a graph illustrating vehicle speed control according to the comparative example when a recommended speed is reduced in a next section. FIG. 6(*a*) shows a state of a vehicle traveling along a certain route, FIG. 6(*b*) shows a recommended speed in each section of the certain route, and FIG. 6(*c*) shows a history of vehicle speed of a preceding vehicle and an own vehicle.

As shown in FIG. 6(*a*), there are two vehicles of an own vehicle 10 and a preceding vehicle 11 in a section I-II of the certain route. The section I-II has a less number of vehicles and a large open space. On the other hand, in a section II-III, there are three vehicles (a vehicle group 12) 12*a*, 12*b*, and 12*c*. The section II-III is in a congested state.

The route is in a state as shown in FIG. 6(*a*), so that the data center 20 transmits a recommended speed $v_{rec1}$ calculated in accordance with traffic conditions of the section I-II to the vehicle 10 as a recommended speed in the section I-II, as shown in FIG. 6(*b*), for example, and transmits a recommended speed $v_{rec2}$ lower than the recommended speed $v_{rec1}$, calculated in accordance with traffic conditions of the section II-III to the vehicle 10, as an estimated speed of the section II-III.

As shown in FIG. 6(*c*), four vehicles of the vehicle 11 and the vehicles 12*a*, 12*b*, and 12*c* each have a speed close to the recommended speed $v_{rec1}$ in the section I-II, and each have a speed close to the recommended speed $v_{rec1}$ near or at a location p1 in the section and then the speed gradually decreases to a speed close to the recommended speed $v_{rec2}$ near or at a location p3 in the section II-III.

Here, a vehicle speed history of the vehicle 10 according to the comparative example when each vehicle travels as described above will be described. The vehicle 10 is subjected to speed control in each section so as to follow a recommended speed in each section.

The vehicle 10 is subjected to the recommended speed control in accordance with the recommended speed $v_{rec1}$ in the section I-II. Thus, in the section I-II, the vehicle 10 has a speed close to the recommended speed $v_{rec1}$. Then, when the vehicle 10 moves from the section I-II to the section the vehicle 10 is subjected to the recommended speed control in accordance with the recommended speed $v_{rec2}$ in the section II-III that has already been received. At this time, the speed of the vehicle 10 decreases from the recommended speed $v_{rec1}$ to the recommended speed $v_{rec2}$, and becomes the same speed as the recommended speed $v_{rec2}$ at a time point p2 before the location p3, for example.

Here, when the vehicle speed history of the vehicle 10 is compared with a vehicle speed history of the vehicle 11 immediately ahead of the vehicle 10, it can be seen that a speed difference between the vehicle 10 and the vehicle 11 increases from the location p1 included in the section II-III. This indicates that immediately after entering the section II-III, the vehicle 10 falls behind the vehicle 11 and an inter-vehicle distance from the vehicle 11 increases. In such a case, it is conceivable that the driver of the vehicle 10 may have a sense of incongruity of falling behind the vehicle 11, so that the driver's psychological burden may increase. In such a case, it is also conceivable that the driver steps on the accelerator pedal so as to increase the speed of the vehicle 10. In this case, the recommended speed control ends, and the speed control in accordance with the recommended speed is not performed unless there is an instruction from the driver after that.

Next, vehicle speed control when a vehicle 13 in which the vehicle control device is mounted according to the first embodiment is in the same situation as the vehicle 10 in FIG. 6 will be described.

Figure 6C:
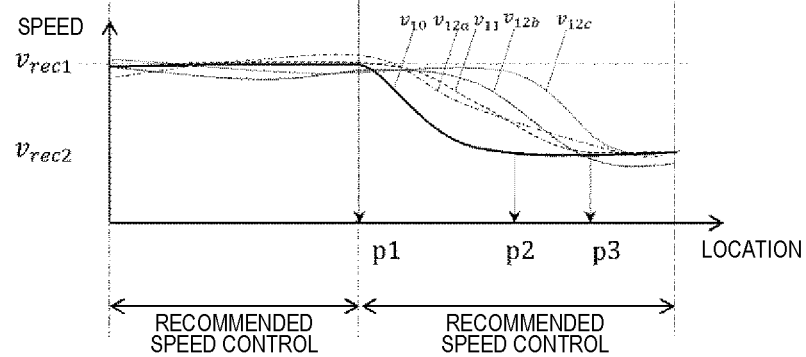
Figure 7A:
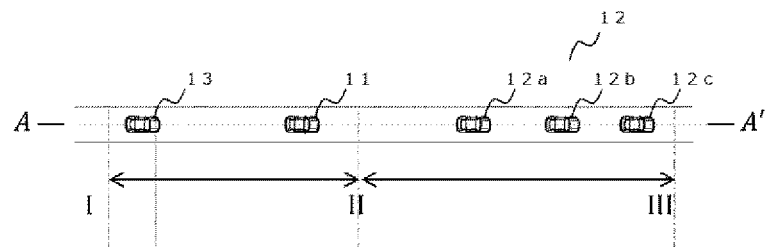
FIGS. 7A to 7C are graphs illustrating vehicle speed control according to the first embodiment when a recommended speed is reduced in a next section.
Figure 7B:
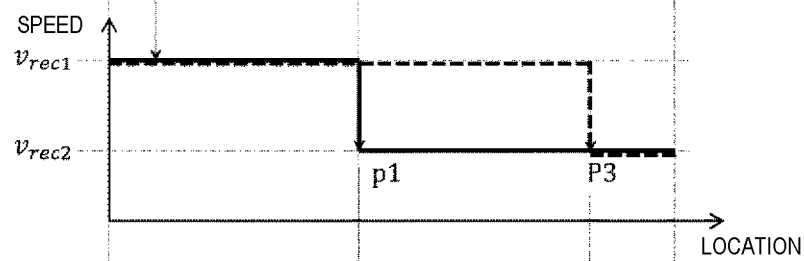
Figure 7C:
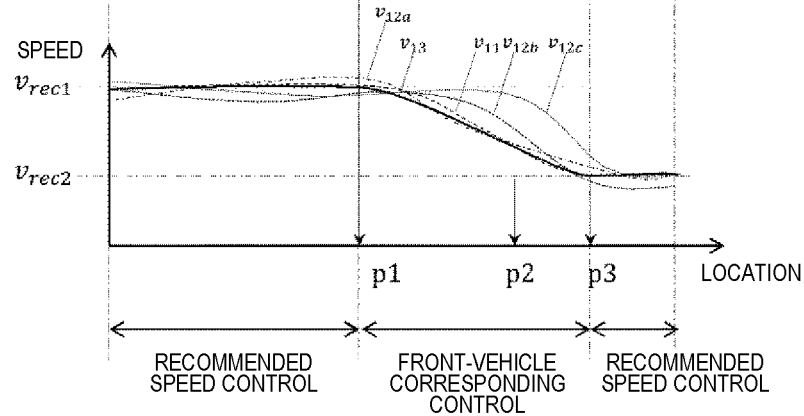

FIG. 7 is a graph illustrating vehicle speed control according to the first embodiment when a recommended speed is reduced in a next section. FIG. 7 shows vehicle speed control when the vehicle 100 according to the present embodiment (the vehicle 13 in FIG. 7) is in a situation similar to the situation shown in FIG. 6. FIG. 7(a) shows a state of a vehicle traveling along a certain route, FIG. 7(b) shows a recommended speed in each section of the certain route, and FIG. 7(c) shows a history of vehicle speed of a preceding vehicle and an own vehicle.

As shown in FIG. 7(a), there are two vehicles of an own vehicle 13 and a preceding vehicle 11 in a section I-II of the certain route. The section I-II has a less number of vehicles and a large open space. On the other hand, in a section II-III, there are three vehicles (a vehicle group 12) 12a, 12b, and 12c. The section II-III is in a congested state.

When the vehicle 13 is at a location shown in FIG. 7(a), a section corresponding to the current location (current section) is the section I-II, and the next section is the section II-III. As shown in FIG. 7(b), a first recommended speed that is a recommended speed for the current section is a recommended speed $v_{rec1}$, and a second recommended speed that is a recommended speed for the next section is a recommended speed $v_{rec2}$ that is lower than the recommended speed $v_{rec1}$.

In this case, in step S004 of FIG. 8, it is determined that the first recommended speed (recommended speed $v_{rec1}$) is larger than the second recommended speed (recommended speed $V_{rec2}$), and the vehicle 13 is started to be subjected to the front vehicle corresponding control with the first recommended speed as the upper limit after the current section ends, i.e., after entering the next section (step S005).

Accordingly, as shown in FIG. 7(c), the vehicle 13 is maintained at a speed more than the second recommended speed until reaching the location p3 after passing the location p1 where the next section starts. Then, after the speed of the vehicle 13 decreases and the condition of step S008 is satisfied (after the location p3), the vehicle 13 is subjected to the recommended speed control in accordance with the second recommended speed (recommended speed $v_{rec1}$).

According to the vehicle speed control according to the present embodiment, as shown in FIG. 7(c), the vehicle 13 has a speed change similar to speed changes ($v_{11}$, $v_{12a}$, $v_{12b}$, and $v_{12c}$) of the preceding vehicle 11 and vehicles constituting the preceding vehicle group 12, indicated by a broken line, a long broken line, and a one-dot chain line.

As a result, the vehicle 13 does not needlessly decelerate immediately after entering the next section unlike the vehicle 10 shown in FIG. 6(c), so that wasteful fuel consumption can be suppressed. The vehicle 13 also can travel following the vehicle 11 to prevent a deceleration different from movement of surrounding vehicles. This does not cause the driver of the vehicle 13 to have a sense of incongruity to enable suppressing increase in the driver's psychological burden.

Next, for describing effect of the vehicle speed control according to the first embodiment when the second recommended speed corresponding to the next section is higher than the first recommended speed corresponding to the current section, first, a comparative example in which vehicle speed control for causing speed to follow a recommended speed in a section is performed for each section will be described.

Figure 9A:
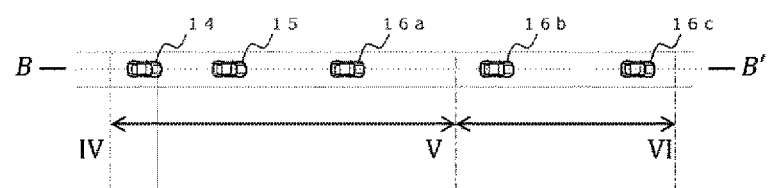
FIGS. 9A to 9C are graphs illustrating vehicle speed control according to a comparative example when a recommended speed is increased in a next section.
Figure 9B:
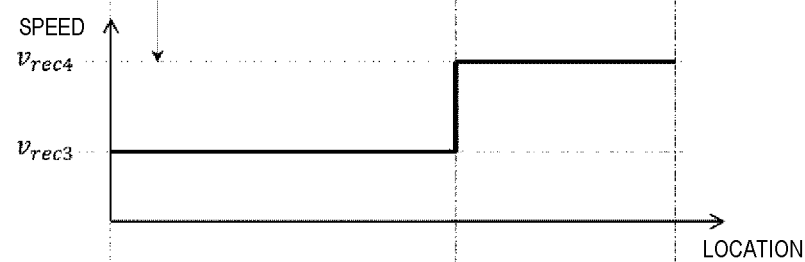
Figure 9C:
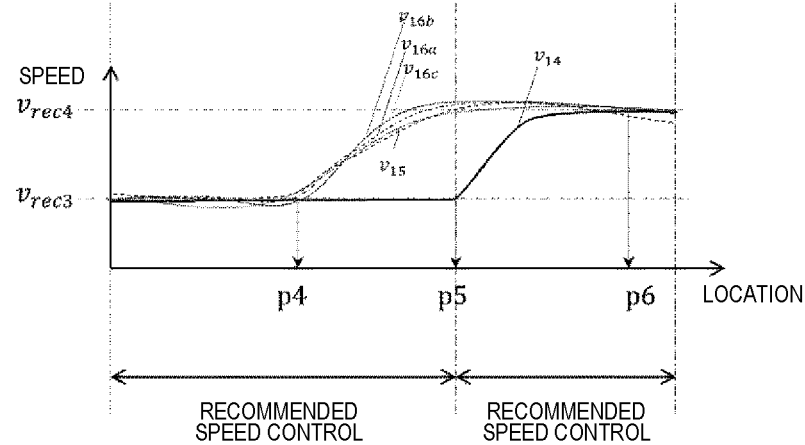

FIG. 9 is a graph illustrating vehicle speed control according to the comparative example when a recommended speed is increased in a next section. FIG. 9(a) shows a state of a vehicle traveling along a certain route, FIG. 9(b) shows a recommended speed in each section of the certain route, and FIG. 9(c) shows a history of vehicle speed of a preceding vehicle and an own vehicle.

As shown in FIG. 9(a), there are three vehicles of an own vehicle 14 and preceding vehicles 15 and 16a in a section IV-V of the certain route. The section IV-V has a large number of vehicles and is in a congested state. On the other hand, in a section V-VI, there are two vehicles 16b and 16c. The section V-VI has a large open space.

The route is in a state as shown in FIG. 9(a), so that the data center 20 transmits a recommended speed $v_{rec3}$ calculated in accordance with traffic conditions of the section IV-V to the vehicle 14 as a recommended speed (first recommended speed) in the section IV-V, as shown in FIG. 9(b), for example, and transmits a recommended speed $v_{rec4}$ higher than the recommended speed $v_{rec3}$, calculated in accordance with traffic conditions of the section V-VI to the vehicle 14, as an estimated speed (second recommended speed) of the section V-VI.

As shown in FIG. 9(c), the four vehicles 15, 16a, 16b, and 16c each move at a speed close to the recommended speed $v_{rec3}$ until a location p4 in the section IV-V in accordance with the traffic conditions. After that, the speed gradually increases and then increases to the recommended speed $v_{rec4}$ of the section V-VI or to a speed close thereto near or at a location p5.

Here, a vehicle speed history of the vehicle 14 according to the comparative example when each vehicle travels as described above will be described. The vehicle 14 is subjected to speed control in each section so as to follow a recommended speed in each section.

The vehicle 14 is subjected to the recommended speed control in accordance with the recommended speed $v_{rec3}$ in the section IV-V. Thus, in the section IV-V, the vehicle 14 has a speed close to the recommended speed $v_{rec3}$. Then, when the vehicle 14 moves from the section IV-V to the section V-VI, the vehicle 14 is subjected to the recommended speed control in accordance with the recommended speed $v_{rec4}$ in the section V-VI. At this time, the speed of the vehicle 14 increases from the recommended speed $v_{rec3}$ to the recommended speed $v_{rec4}$, and becomes the same speed as the recommended speed $v_{rec4}$ at a location p6, for example.

Here, when the vehicle speed history of the vehicle 14 is compared with a vehicle speed history of the vehicle 15 immediately ahead of the vehicle 14, it can be seen that a speed difference between the vehicle 14 and the vehicle 15 increases because the speed of the vehicle 15 increases from the location p4 in the section IV-V. This indicates that the vehicle 14 falls behind the vehicle 15 in the section IV-V and an inter-vehicle distance from the vehicle 15 increases. In such a case, it is conceivable that the driver of the vehicle 14 may have a sense of incongruity of falling behind the vehicle 15, so that the driver's psychological burden may increase. In such a case, it is also conceivable that the driver steps on the accelerator pedal so as to increase the speed of the vehicle 14. In this case, the recommended speed control ends, and the speed control in accordance with the recommended speed is not performed unless there is an instruction from the driver.

Next, vehicle speed control when a vehicle 17 in which the vehicle control device is mounted according to the first embodiment is in the same situation as the vehicle 14 in FIG. 9 will be described.

Figure 10A:
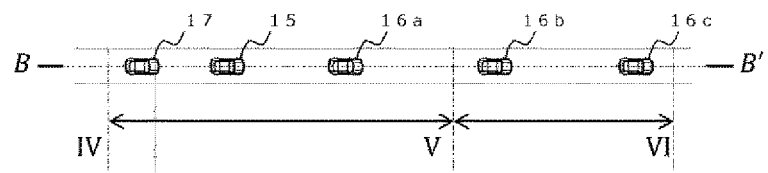
FIGS. 10A to 10C are graphs illustrating vehicle speed control according to the first embodiment when a recommended speed is increased in a next section.
Figure 10B:
Figure 10C:
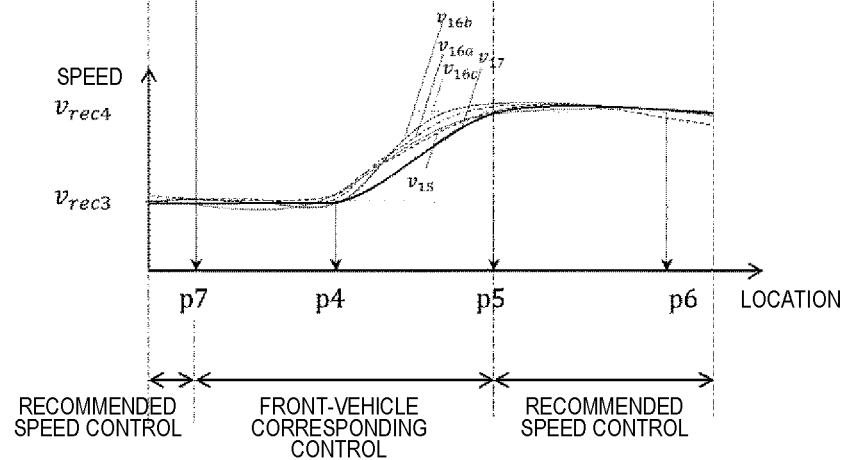

FIG. 10 is a graph illustrating vehicle speed control according to the first embodiment when a recommended speed is increased in a next section. FIG. 10 shows vehicle speed control when the vehicle 100 according to the present embodiment (the vehicle 17 in FIG. 10) is in a situation similar to the situation shown in FIG. 9. FIG. 10(*a*) shows a state of a vehicle traveling along a certain route, FIG. 10(*b*) shows a recommended speed in each section of the certain route, and FIG. 10(*c*) shows a history of vehicle speed of a preceding vehicle and an own vehicle.

As shown in FIG. 10(*a*), there are three vehicles of an own vehicle 17 and preceding vehicles 15 and 16*a* in a section IV-V of the certain route. The section IV-V has a large number of vehicles and is in a congested state. On the other hand, in a section V-VI, there are two vehicles 16*b* and 16*c*. The section V-VI has a large open space.

When the vehicle 17 is at a location shown in FIG. 10(*a*), a section corresponding to the current location (current section) is the section IV-V, and the next section is the section V-VI. As shown in FIG. 10(*b*), a first recommended speed that is a recommended speed for the current section is a recommended speed $v_{rec3}$, and a second recommended speed that is a recommended speed for the next section is a recommended speed $v_{rec4}$ that is higher than the recommended speed $v_{rec3}$.

In this case, in step S004 of FIG. 8, it is determined that the first recommended speed (recommended speed $v_{rec3}$) is equal to or less than the second recommended speed (recommended speed $v_{rec4}$), and the vehicle 13 is started to be subjected to the front vehicle corresponding control in which the speed of the vehicle 100 is increased to more than the first recommended speed (recommended speed $v_{rec3}$) in the current section (step S006).

Accordingly, as shown in FIG. 10(*c*), after passing the location p4 in the current section where the front vehicle 15 started to increase in speed, the vehicle 17 is maintained at a speed more than the first recommended speed. Then, after the speed of the vehicle 17 increases and the condition of step S008 is satisfied (e.g., after the location p5), the vehicle 17 is subjected to the recommended speed control in accordance with the second recommended speed (recommended speed $v_{rec4}$).

According to the vehicle speed control according to the present embodiment, as shown in FIG. 10(*c*), the vehicle 17 has a speed change similar to speed changes ($v_{15}$, $v_{16a}$, $v_{16b}$, and $v_{16c}$) of the preceding vehicle 11 and vehicles constituting the preceding vehicle group 12, indicated by a broken line, a long broken line, and a one-dot chain line. As a result, the vehicle 17 can travel following the front vehicle 15 when the front vehicle 15 accelerates in the current section, like the vehicle 10 shown in FIG. 10(*c*), so that an increase in the inter-vehicle distance from the front vehicle 15 can be suppressed. This does not cause the driver of the vehicle 17 to have a sense of incongruity to enable suppressing increase in the driver's psychological burden.

Second Embodiment

Next, a second embodiment of the present invention will be described. A vehicle according to the second embodiment is substantially similar to the vehicle according to the first embodiment, so that difference from the vehicle according to the first embodiment will be described. The vehicle according to the second embodiment is configured to change speed control when a recommended speed corresponding to a current section changes during traveling in the current section.

Figures 11A, 11B, 11C, 11D, 11E:
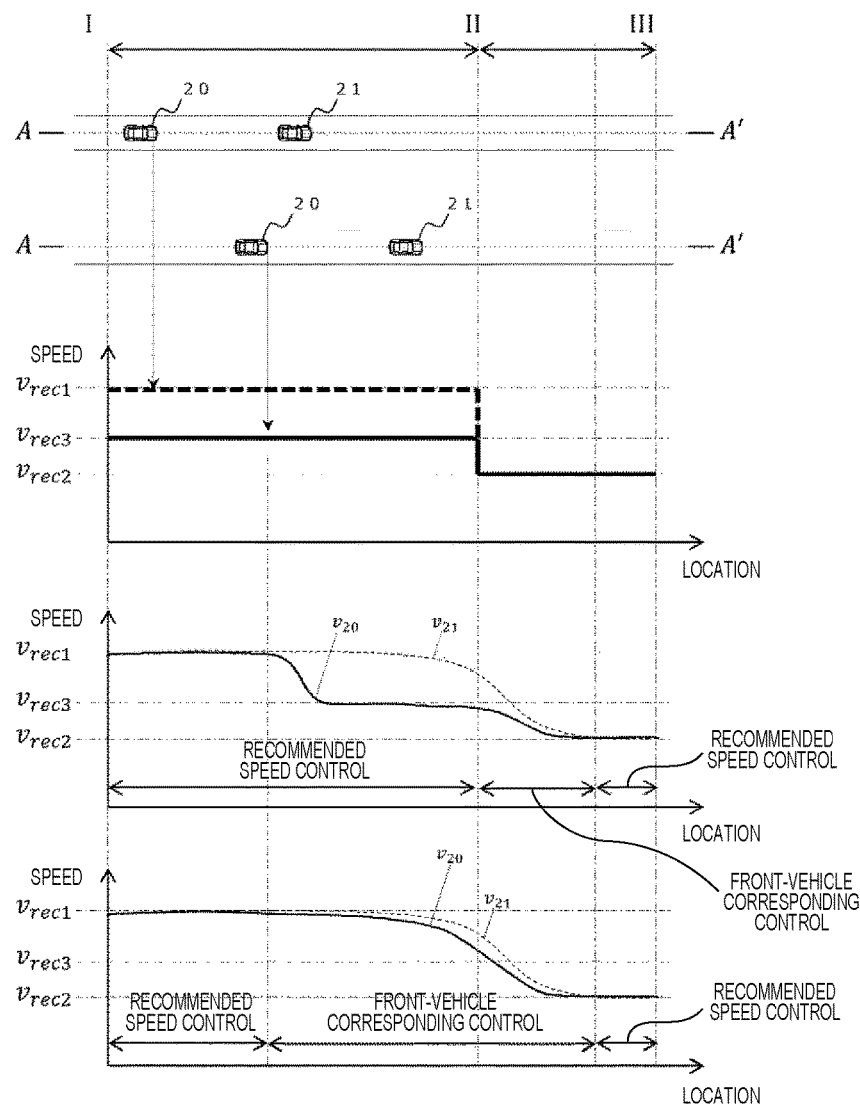
FIGS. 11A to 11E are graphs illustrating vehicle speed control according to a second embodiment.

FIG. 11 is a graph illustrating vehicle speed control according to the second embodiment. FIG. 11(*a*) shows a state of a vehicle traveling along a certain route, FIG. 11(*a'*) shows a state of the vehicle traveling along the certain route at another time point, FIG. 11(*b*) shows a recommended speed in each section of the certain route, FIG. 11(*c*) shows a vehicle speed history of each of a vehicle under the speed control according to the first embodiment and a preceding vehicle, and FIG. 11(*c'*) shows a vehicle speed history of each of a vehicle under the speed control according to the second embodiment and a preceding vehicle.

For example, when the vehicle 20 traveling on the route as shown in FIG. 11(*a*) has the recommended speed $v_{rec1}$ of the current section (section I-II) acquired at certain timing by communication, at a certain point of time, and then receives a new recommended speed $v_{rec3}$ (first recommended speed after change) for the current section during traveling in the current section as shown in FIG. 11(*a'*), the recommended speed for each section is indicated by the solid line in FIG. 11(*b*).

At this time, when the vehicle 20 is subjected to the recommended speed control in accordance with the recommended speed (first recommended speed) in this section, the vehicle 20 changes in speed as shown in FIG. 11(*c*). That is, after receiving the new recommended speed, the vehicle 20 is subjected to the recommended speed control in accordance with the new recommended speed $v_{rec3}$ in the current section, and thus immediately after receiving the new recommended speed, the vehicle 20 is decelerated as shown in FIG. 11(*c*). Such control causes the vehicle 20 to start to decelerate at timing different from that of a preceding vehicle 21. Thus, it is conceivable that a driver may have a sense of incongruity of falling behind the preceding vehicle 21, so that the driver's psychological burden may increase. In such a case, it is also conceivable that the driver steps on the accelerator pedal so as to increase the speed of the vehicle 14. In this case, the recommended speed control ends, and the speed control in accordance with the recommended speed is not performed unless there is an instruction from the driver.

In contrast, the acceleration and deceleration control device 123 according to the present embodiment determines a magnitude relationship between a recommended speed before change and a new recommended speed after change when acquiring the new recommended speed after change before passing through the current section (section I-II). Then, in accordance with the determination result, the acceleration and deceleration control device 123 performs control to switch between performing the recommended speed control in accordance with the recommended speed having changed and performing the front vehicle corresponding control with the recommended speed before change as the upper limit. For example, when determining that the recommended speed after change is less than the recommended speed before change, the acceleration and deceleration control device 123 performs the front vehicle corresponding control (or the recommended speed control) with the upper limit of the recommended speed $v_{rec1}$ before change as shown in FIG. 11(c'). Such control causes a speed change $v_{20}$ of the vehicle 20 to change in a similar manner to a speed change $v_{21}$ of the preceding vehicle 21, so that increase in inter-vehicle distance from the preceding vehicle 21 is suppressed to enable suppressing a driver's psychological burden.

On the other hand, when the recommended speed after change is more than the recommended speed before change, the acceleration and deceleration control device 123 performs the recommended speed control in accordance with the recommended speed after change. During the recommended speed control, the acceleration and deceleration control device 123 performs the front vehicle corresponding control when the vehicle 20 approaches the preceding vehicle 21 within a predetermined inter-vehicle distance.

Third Embodiment

Next, a third embodiment of the present invention will be described. A vehicle according to the third embodiment is substantially similar to the vehicle according to the first embodiment, so that difference from the vehicle according to the first embodiment will be described. The vehicle according to the third embodiment is different from the vehicle according to the first embodiment in configuration of the preceding vehicle behavior comparison unit 1232.

Figure 12:
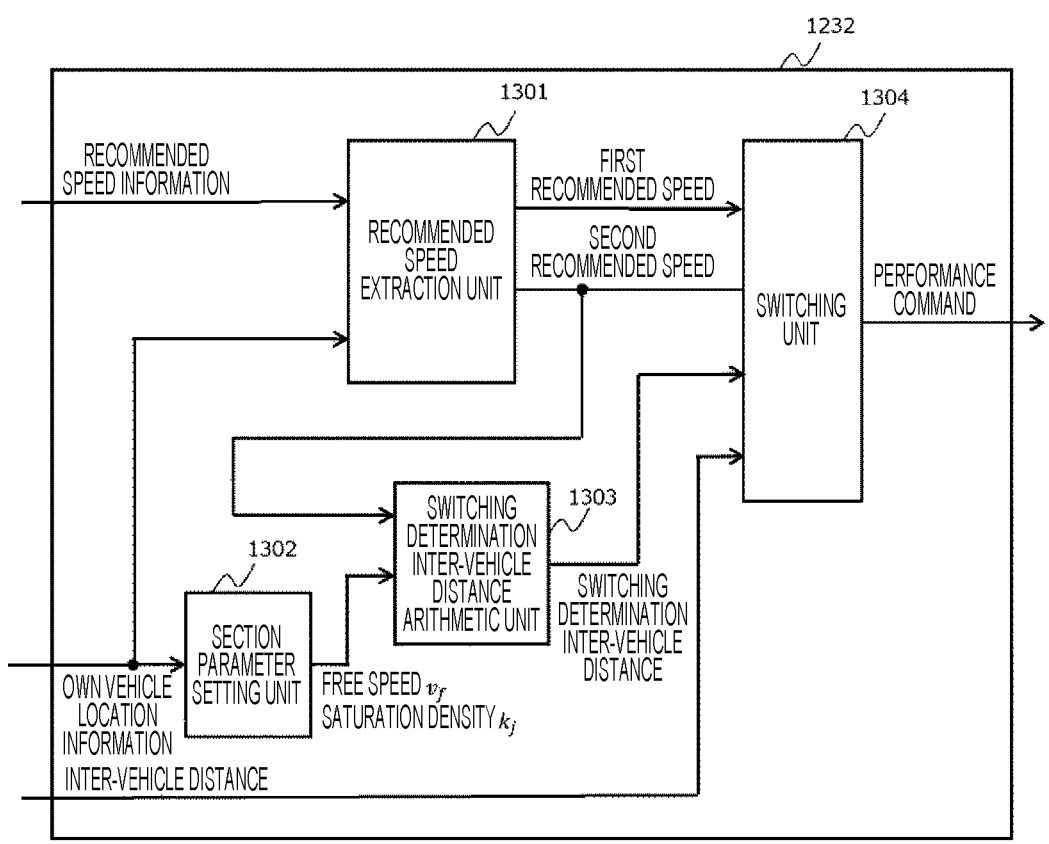
FIG. 12 is a configuration diagram of a preceding vehicle behavior comparison unit according to a third embodiment.

FIG. 12 is a configuration diagram of a preceding vehicle behavior comparison unit according to the third embodiment.

The preceding vehicle behavior comparison unit 1232 includes a recommended speed extraction unit 1301, a section parameter setting unit 1302, a switching determination inter-vehicle distance arithmetic unit 1303 as an example of a traffic condition estimation unit, an inter-vehicle information acquisition unit, and a switching unit 1304 as an example of an inter-vehicle information acquisition unit and a speed control unit.

The recommended speed detection unit 1301 extracts the first recommended speed and the second recommended speed in accordance with location information and a recommended speed acquired by communication. The recommended speed detection unit 1301 performs the processing from step S001 to step S003 illustrated in FIG. 8.

The section parameter setting unit 1302 extracts parameters of a so-called traffic density relational expression in accordance with the location information on the own vehicle. The parameters of the traffic density relational expression include free speed, saturation density, and the like, for example. The free speed is a speed when the density is 0, and is a parameter that can be set in accordance with a speed limit of a route, a regulation speed, a speed measurement result when the route is very free, or the like. The saturation density is a traffic density when the route is completely congested and the vehicle stops, and is set to a value of 180 vehicles/km, for example.

The switching determination inter-vehicle distance arithmetic unit 1303 predicts (calculates) an inter-vehicle distance (switching determination inter-vehicle distance) in traffic conditions corresponding to the second recommended speed in accordance with the second recommended speed and a section parameter. The switching determination inter-vehicle distance arithmetic unit 1303 calculates an inter-vehicle distance "s" according to Expression (6) shown below. Here, Expression (4) shown below is known as a traffic density relational expression of known Greenshields. In addition, traffic density "k" and the inter-vehicle distance "s" have a reciprocal relationship as shown in Expression (5). Thus, the inter-vehicle distance "s" is expressed as shown in Expression (6) from Expressions (4) and (5). The inter-vehicle distance "s" corresponds to an average inter-vehicle distance in the traffic conditions corresponding to the second recommended speed.

[Expression 4]

$$\text{Greenshields } v_{reccomend} = v_f\left(1 - \frac{k}{k_j}\right) \quad (4)$$

$$s = \frac{1}{k} \quad (5)$$

$$s = \frac{1}{\left(1 - \frac{v_f}{v_{recommend}}\right)k_j} \quad (6)$$

$k$ Saturation traffic density
$s$ Inter-vehicle distance
$v_f$ Free speed
$k_j$ Saturation density The switching unit 1304 determines whether traffic conditions around the vehicle corresponds to the second recommended speed in accordance with the first recommended speed, the second recommended speed, the switching determination inter-vehicle distance, and the measured inter-vehicle distance, and outputs a command to perform the recommended speed control or the front vehicle corresponding control in accordance with a determination result.

Next, vehicle speed control processing using the vehicle control device 101 according to the third embodiment will be described.

Figure 13:
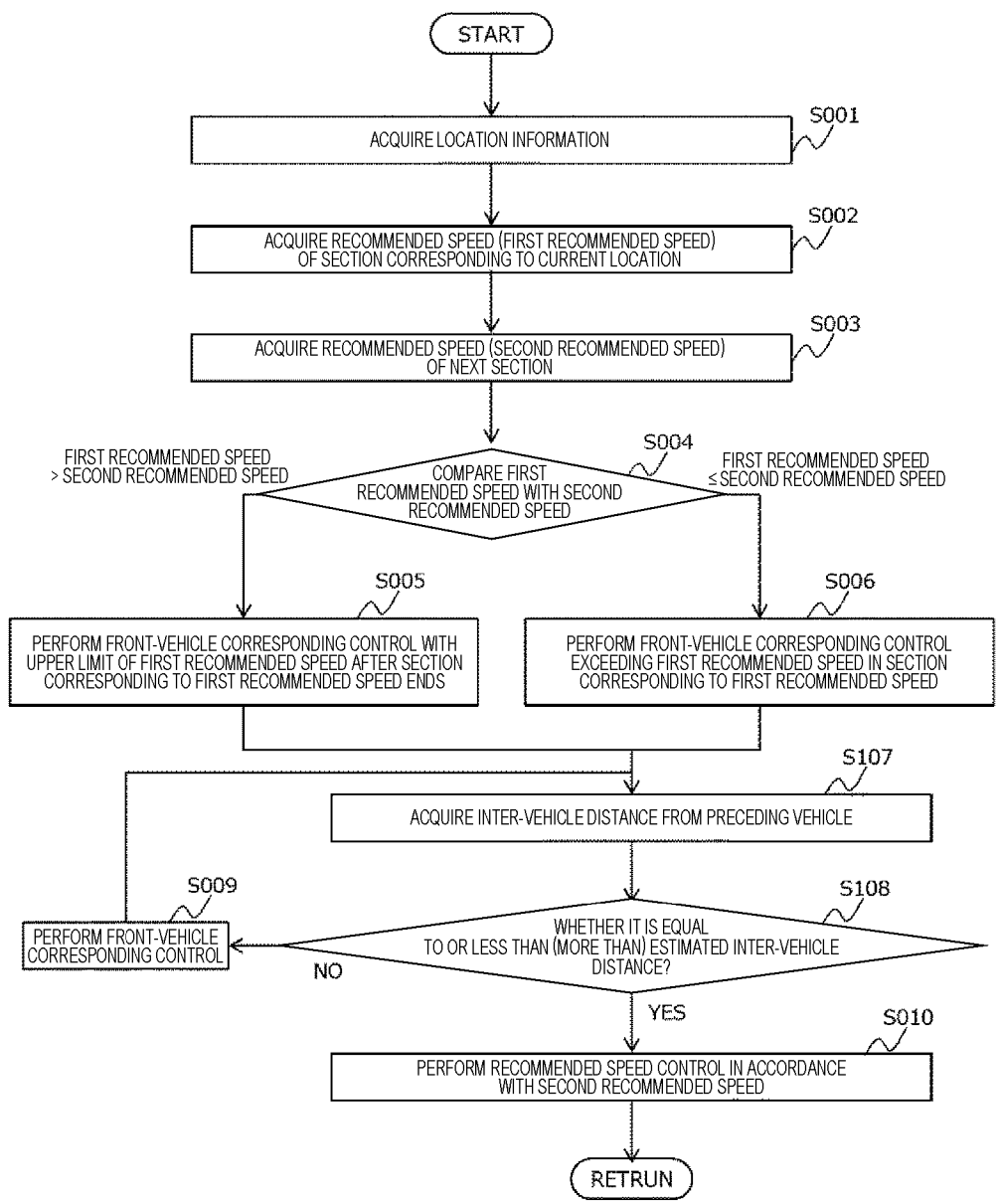
FIG. 13 is a flowchart of vehicle speed control processing according to the third embodiment.

FIG. 13 is a flowchart of the vehicle speed control processing according to the third embodiment. Portions similar to those in the vehicle speed control processing according to the first embodiment illustrated in FIG. 8 are denoted by the same reference numerals, and duplicated description is eliminated.

After step S005 or step S006 is performed, the switching unit 1304 acquires an inter-vehicle distance from the preceding vehicle (step S107). Next, the switching unit 1304 compares the acquired inter-vehicle distance with the inter-vehicle distance predicted by the switching determination inter-vehicle distance arithmetic unit 1303 (switching determination inter-vehicle distance) (step S108).

When step S005 is performed, the switching unit 1304 determines whether the acquired inter-vehicle distance is equal to or less than the inter-vehicle distance predicted by the switching determination inter-vehicle distance arithmetic unit 1303 (switching determination inter-vehicle distance) in step S108. As a result, when the acquired inter-vehicle distance is equal to or less than the switching determination inter-vehicle distance (YES at step S108), it means that a state of the vehicle 100 corresponds to the traffic conditions corresponding to the second recommended speed. Thus, the switching unit 1304 allows the processing to proceed to step S010. On the other hand, when the acquired inter-vehicle distance is not equal to or less than the switching determination inter-vehicle distance (NO at step S108), the processing proceeds to step S009.

On the other hand, when step S006 is performed, the switching unit 1304 determines whether the acquired inter-vehicle distance is equal to or more than the inter-vehicle distance predicted by the switching determination inter-vehicle distance arithmetic unit 1303 (switching determination inter-vehicle distance) instep S108. As a result, when the acquired inter-vehicle distance is equal to or more than the switching determination inter-vehicle distance (YES at step S108), it means that a state of the vehicle 100 corresponds to the traffic conditions corresponding to the second recommended speed. Thus, the switching unit 1304 allows the processing to proceed to step S010. On the other hand, when the acquired inter-vehicle distance is not equal to or more than the switching determination inter-vehicle distance (NO at step S108), the processing proceeds to step S009.

For example, according to the vehicle speed control processing of the first embodiment, it is determined whether to terminate the speed control started in step S005 or step S006, in accordance with the relationship between speed of the own vehicle and the second recommended speed, at step S008. In this processing, for example, when the preceding vehicle repeats acceleration and deceleration due to influence of a vehicle ahead of the preceding vehicle or the like, a deceleration wave propagates to the own vehicle to temporarily reduce the speed of the own vehicle extremely. This may satisfy conditions related to the second recommended speed and terminate the speed control, so that the own vehicle may fall behind the preceding vehicle after the preceding vehicle accelerates. In contrast, according to the vehicle speed control process of the third embodiment, it is determined whether the inter-vehicle distance between the preceding vehicle and the own vehicle is an inter-vehicle distance assumed to be realized in the traffic conditions corresponding to the second recommended speed. Thus, the traffic conditions around the own vehicle can be appropriately determined to enable speed control suitable for the traffic conditions. For this reason, increase in the psychological burden on the driver of the vehicle 100 can be suppressed.

Fourth Embodiment

Next, a fourth embodiment of the present invention will be described. Difference between the vehicle according to the fourth embodiment and the vehicle according to the first embodiment will be described.

FIG. 14 is a graph illustrating vehicle speed control according to the fourth embodiment. FIG. 14(a) shows a state of a vehicle traveling along a certain route, FIG. 14(b) shows a recommended speed in each section of the certain route, FIG. 14(c) shows a vehicle speed history of each of a vehicle under the speed control according to the first embodiment and a preceding vehicle, and FIG. 14(c') shows a vehicle speed history of each of a vehicle under the speed control according to the fourth embodiment and a preceding vehicle.

Figure 14A:
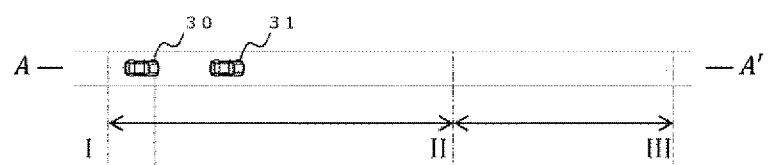
FIGS. 14A to 14D are graphs illustrating vehicle speed control according to a fourth embodiment.
Figure 14B:
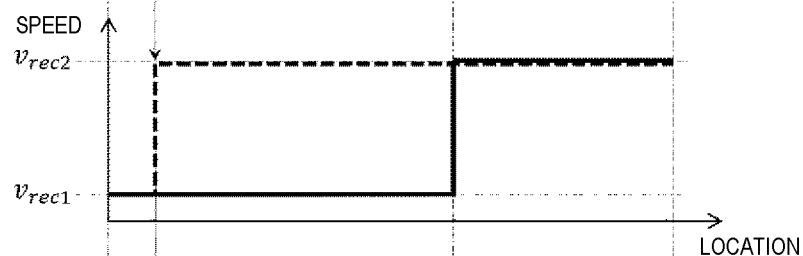

When the route has a state as shown in FIG. 14(a), the data center 20 transmits a recommended speed $v_{rec1}$ to the vehicle 30 as a recommended speed (first recommended speed) in a section I-II, and transmits a recommended speed $v_{rec2}$ higher than the recommended speed $v_{rec1}$ to the vehicle 30 as an estimated speed (second recommended speed) in a section II-III, as shown in FIG. 14(b), for example.

Figure 14C:
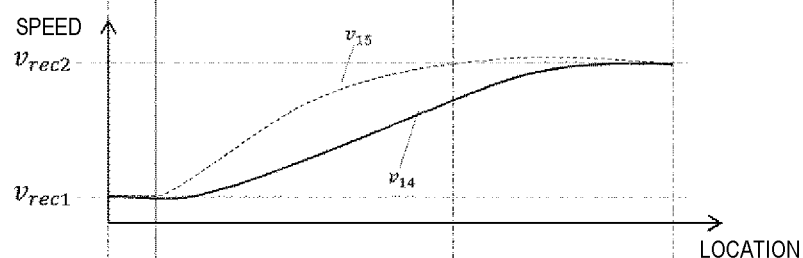
Figure 14D:
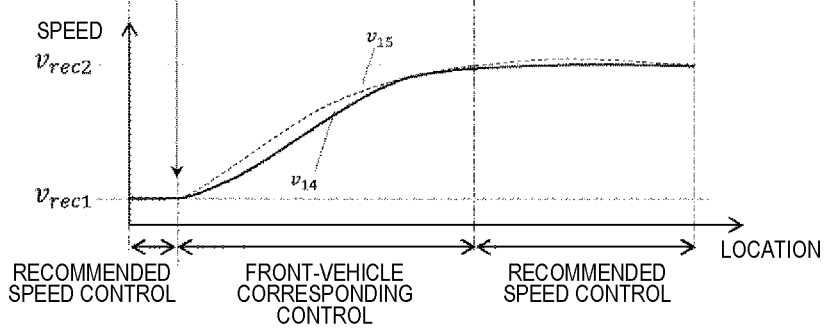

In this case, the preceding vehicle 31 greatly increases in speed when the forward traffic conditions become empty. In contrast, the vehicle speed control processing according to the first embodiment allows the vehicle 30 to be subjected to the front vehicle corresponding control during the section I-II, as shown in FIG. 14(c). The front vehicle corresponding control allows the vehicle to be accelerated in accordance with a predetermined acceleration gain, for example.

For example, when the second recommended speed is higher than the first recommended speed, the preceding vehicle 31 greatly increases in speed as a difference between the second recommended speed and the first recommended speed increases. In such a case, when the acceleration gain in the front vehicle corresponding control is set to a constant value, a speed difference from the preceding vehicle 31 increases as the difference between the second recommended speed and the first recommended speed increases. Thus, an inter-vehicle distance from the preceding vehicle 31 increases. This may cause the driver to feel that the vehicle lags, so that the driver may perform an operation such as depressing the accelerator pedal, and thus the recommended speed control may be stopped. Thus, in the present embodiment, the acceleration and deceleration control device 123 allows the acceleration gain to increase as a difference between the second recommended speed and the first recommended speed increases, when the second recommended speed is higher than the first recommended speed, as shown in FIG. 14(c'), to improve followability to the preceding vehicle 31. Accordingly, increase in the inter-vehicle distance from the preceding vehicle 31 is appropriately suppressed, so that the followability to the preceding vehicle 31 is improved.

On the other hand, when the second recommended speed is lower than the first recommended speed, the speed of the vehicle 30 will eventually approach the first recommended speed. Thus, to prevent needless acceleration midway in the approach, the acceleration gain in the front vehicle corresponding control is reduced as the difference between the second recommended speed and the first recommended speed increases. This enables preventing needless acceleration when the vehicle 30 is eventually decelerated, so that fuel consumption can be suppressed.

Fifth Embodiment

Next, a fifth embodiment of the present invention will be described. Difference between the vehicle according to the fifth embodiment and the vehicle according to the first embodiment will be described.

The vehicle according to the fifth embodiment has a feature in a relationship between an inter-vehicle distance to be targeted (target inter-vehicle distance) when being subjected to the front vehicle corresponding control, and an inter-vehicle distance (switching inter-vehicle distance) for switching between the front vehicle corresponding control and the recommended speed control.

Figure 15A:
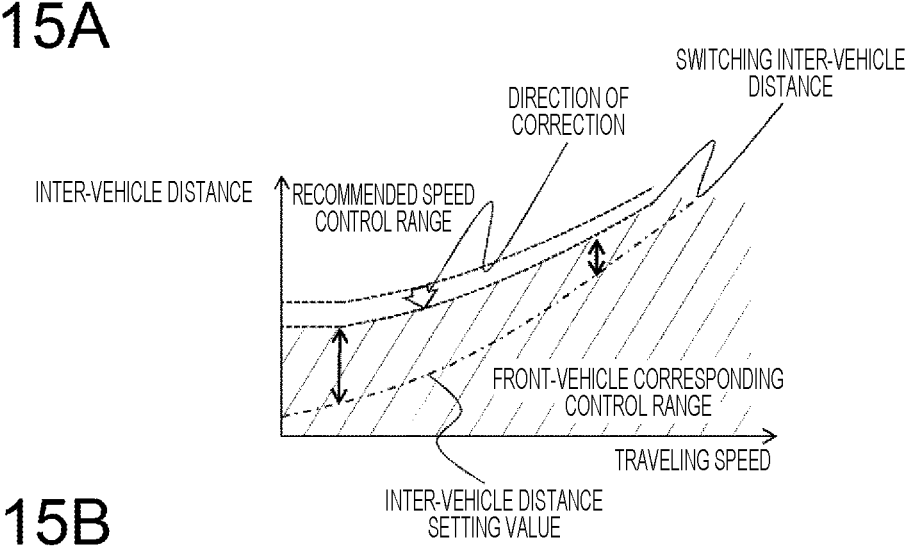
FIGS. 15A and 15B are graphs illustrating a target inter-vehicle distance in front vehicle corresponding control, and control ranges of the front vehicle corresponding control and recommended speed control, according to a fifth embodiment.
Figure 15B:
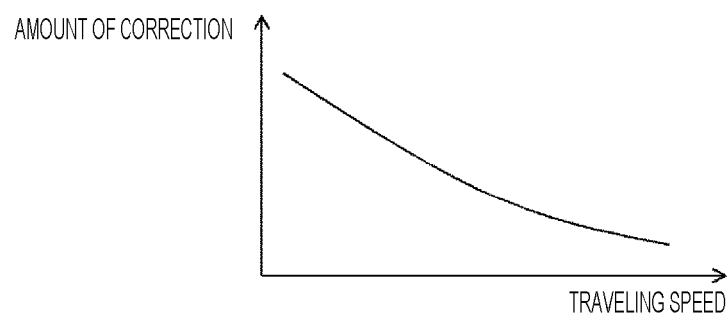

FIG. 15 is a graph illustrating the target inter-vehicle distance in the front vehicle corresponding control, and control ranges of the front vehicle corresponding control and the recommended speed control, according to the fifth embodiment. FIG. 15(a) is a graph illustrating a relationship between travel speed of the vehicle, and the target inter-vehicle distance and the switching inter-vehicle distance, and FIG. 15(b) is a graph illustrating the amount of correction of the switching inter-vehicle distance.

The acceleration and deceleration control device 123 according to the present embodiment sets not only a certain target inter-vehicle distance for the traveling speed of the vehicle, but also the switching inter-vehicle distance for switching between the front vehicle corresponding control and the recommended speed control, as shown in FIG. 15(a).

When the front vehicle corresponding control is performed, low vehicle speed causes increase in the number of times of acceleration and deceleration. Thus, the recommended speed control is more likely to provide economical traveling. Then, when the inter-switching vehicle distance is corrected at a low traveling speed to enable a quick shift to the recommended speed control, the correction is performed so as to shorten the switching inter-vehicle distance for starting the recommended speed control. As shown in FIG. 15(b), the amount of correction for the switching inter-vehicle distance is set to increase as travelling speed decreases.

When the correction amount is increased to reduce a range of the front vehicle corresponding control as the travelling speed decreases as described above, opportunity to provide economical travel can be increased by encouraging the shift to the recommended speed control.

The correction as described above causes an early shift to the recommended speed control when a vehicle starts from an extremely low vehicle speed and a preceding vehicle has a large acceleration. In this case, a driver may probably feel that the vehicle lags, so that opportunity for the driver to intervene in driving the vehicle increases.

This may stop economical traveling by the recommended speed control.

Thus, in a region with an extremely low vehicle speed such as that immediately after starting, the switching inter-vehicle distance is set large to increase a difference between the target inter-vehicle distance for traveling speed and the switching inter-vehicle distance allowing the recommended speed control to start. In other words, when an own vehicle and a preceding vehicle each have a low speed, enhancing followability to the preceding vehicle by expanding an application range of the front vehicle corresponding control enables reducing increase in a driver's psychological burden. This enables suppressing increase in the driver's psychological burden while providing economical traveling.

Sixth Embodiment

Next, a sixth embodiment of the present invention will be described. Difference between the vehicle according to the sixth embodiment and the vehicle according to the first embodiment will be described.

The acceleration and deceleration control device 123 according to the sixth embodiment acquires a recommended speed (third recommended speed) of a section (a third section of a section after the next) ahead of the next section in a route (traveling direction), and performs speed control on the vehicle 100 also in consideration of the third recommended speed.

FIG. 16 is a diagram illustrating vehicle speed control according to the sixth embodiment. FIG. 16(a) shows a state of a vehicle traveling along a certain route, FIG. 16(b) shows a recommended speed in each section of the certain route, FIG. 16(c) shows a vehicle speed history of each of a vehicle under the speed control according to the first embodiment and a preceding vehicle, and FIG. 16(c') shows a vehicle speed history of each of a vehicle under the speed control according to the sixth embodiment and a preceding vehicle.

Figure 16A:
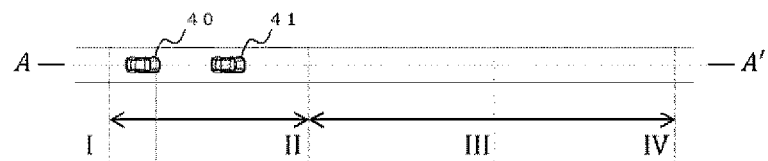
FIGS. 16A to 16D are graphs illustrating vehicle speed control according to a sixth embodiment.
Figure 16B:
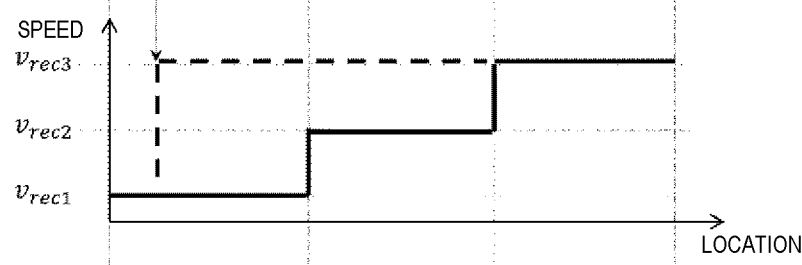

When the route has a state as shown in FIG. 16(a), the data center 20 transmits a recommended speed $v_{rec1}$ to the vehicle 40 as a recommended speed (first recommended speed) in a section I-II, transmits a recommended speed $v_{rec2}$ higher than the recommended speed $v_{rec1}$ to the vehicle 40 as an estimated speed (second recommended speed) in a section II-III, and transmits a recommended speed $v_{rec3}$ higher than the recommended speed $v_{rec2}$ to the vehicle 40 as an estimated speed (third recommended speed) in a section III-IV, as shown in FIG. 16(b), for example.

Figure 16C:
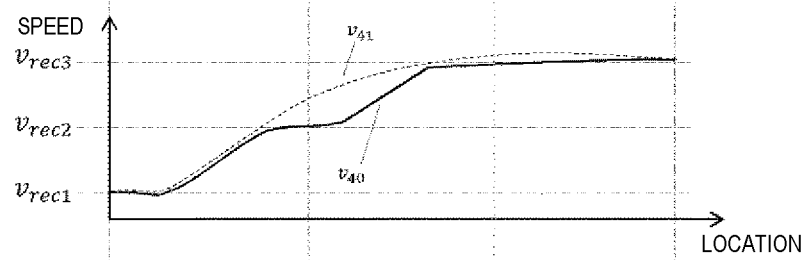
Figure 16D:
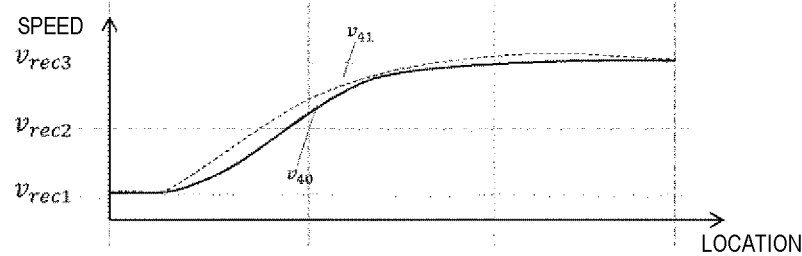

In this case, when the vehicle speed control in the first embodiment is performed, as shown in FIG. 16(c), the vehicle 40 has a speed history $v_{40}$ in which the front vehicle corresponding control with the upper limit of the recommended speed $v_{rec2}$ of the section II-III is performed in the section I-II, and the front vehicle corresponding control with the upper limit of the recommended speed $v_{rec3}$ of the section III-IV is performed in the section II-III. In this case, the speed history $v_{40}$ of the vehicle 40 is different from a speed history $v_{41}$ of the preceding vehicle 41. This causes an inter-vehicle distance from the preceding vehicle 41 to increase to give the driver a sense of incongruity.

In contrast, the acceleration and deceleration control device 123 according to the present embodiment acquires the recommended speed (third recommended speed) of the section further ahead of the next section (the third section of the section after the next), and when the second recommended speed is higher than the first recommended speed and the third recommended speed is higher than the second recommended speed, the acceleration and deceleration control device 123 performs speed control with the upper limit of the third recommended speed from the current section. As shown in FIG. 16(a), the acceleration and deceleration control device 123 performs the front vehicle corresponding control when there is the preceding vehicle 41 ahead of the vehicle 40, and performs the recommended speed control with the upper limit of the third recommended speed when there is no preceding vehicle 41. This control enables the vehicle 40 to appropriately follow the preceding vehicle 41, as shown in FIG. 16(c'). When the third recommended speed exceeds the legal speed of the section, the recommended speed control with the upper limit of the legal speed may be performed for the section.

According to this vehicle speed control processing, when a recommended speed gradually increases to a section further ahead, followability to a preceding vehicle can be enhanced. Thus, opportunity for a driver to intervene in acceleration operation can be reduced, so that more economical traveling can be provided by suppressing needless acceleration.

The present invention is not limited to the embodiments described above, and thus the embodiments may be appropriately modified within a range without departing from the spirit of the present invention.

For example, while in the embodiments described above, the vehicle 100 provided with the engine as a drive source is exemplified, the present invention is not limited to this, and the present invention may be applied to a vehicle using an electric motor as a drive source, or using an electric motor and an engine as drive sources. For example, the vehicle may be an electric car or a hybrid electric car. The type of vehicle is not limited to a passenger car, and may be a freight vehicle such as a truck or a shared vehicle such as a bus.

REFERENCE SIGNS LIST 10 vehicle control system
20 data center
100 vehicle
101 vehicle control device
123 acceleration and deceleration control device
124 telematics device
125 navigation device

The invention claimed is:

1. A vehicle control device configured to control traveling of a vehicle including a recommended speed acquisition unit configured to acquire recommended speeds for the vehicle in accordance with traffic conditions in a plurality of sections, the vehicle control device comprising:
   a determination unit that determines a magnitude relationship between a first recommended speed in a first section where the vehicle currently travels, and a second recommended speed in a second section extending from the first section in a traveling direction of the vehicle, among the recommended speeds acquired by the recommended speed acquisition unit; and
   a speed control unit that performs speed control of the vehicle in accordance with the magnitude relationship between the first recommended speed and the second recommended speed determined by the determination unit, wherein
      the speed control unit causes a speed of the vehicle to increase to become the second recommended speed in the first section, when the determination unit determines that the second recommended speed is equal to or more than the first recommended speed,
      the recommended speed acquisition unit acquires an updated first recommended speed, the updated first recommended speed being a new recommended speed related to the first section,
      the determination unit determines a magnitude relationship between the updated first recommended speed and the first recommended speed, and
      the speed control unit controls the speed of the vehicle to be maintained at a speed of the first recommended speed in the first section, when the determination unit determines that the updated first recommended speed is less than the first recommended speed.

2. The vehicle control device according to claim 1, wherein
   the speed control unit controls the speed of the vehicle to be maintained at a speed of the first recommended speed after the vehicle reaches the second section from the first section, when the determination unit determines that the second recommended speed is less than the first recommended speed.

3. The vehicle control device according to claim 1, wherein
   the speed control unit controls the speed of the vehicle to increase to that of the updated first recommended speed in the first section when the determination unit determines that the updated first recommended speed is more than the first recommended speed.

4. The vehicle control device according to claim 1, further comprising:
   an inter-vehicle information acquisition unit that acquires information related to an inter-vehicle distance from a vehicle traveling ahead; and
   a traffic conditions estimation unit that estimates an average inter-vehicle distance in the second section in accordance with the second recommended speed,
   wherein the speed control unit performs front vehicle corresponding control to cause the vehicle to have a speed for following the vehicle traveling ahead when it is determined that the second recommended speed is more than the first recommended speed and the inter-vehicle distance from the vehicle traveling ahead is equal to or less than the average inter-vehicle distance.

5. The vehicle control device according to claim 2, further comprising:
   an inter-vehicle information acquisition unit that acquires information related to an inter-vehicle distance from a vehicle traveling ahead; and
   a traffic conditions estimation unit that estimates an average inter-vehicle distance in the second section in accordance with the second recommended speed,
   wherein the speed control unit controls the vehicle to have the second recommended speed when it is determined that the second recommended speed is less than the first recommended speed and the inter-vehicle distance from the vehicle traveling ahead is equal to or more than the average inter-vehicle distance under performing of front vehicle corresponding control of causing the vehicle to have a speed for following the vehicle traveling ahead.

6. The vehicle control device according to claim 1, wherein
   the speed control unit sets an acceleration gain for controlling speed of the vehicle smaller than a given value as a difference between the first recommended speed and the second recommended speed increases, when it is determined that the second recommended speed is less than the first recommended speed.

7. The vehicle control device according to claim 2, wherein
   the speed control unit sets an acceleration gain for controlling speed of the vehicle larger than a given value as a difference between the first recommended speed and the second recommended speed increases, when it is determined that the second recommended speed is more than the first recommended speed.

8. The vehicle control device according to claim 1, wherein
   the speed control unit switches between front vehicle corresponding control of causing the vehicle to have a speed allowing the inter-vehicle distance from a vehicle traveling ahead to be a predetermined target inter-vehicle distance in accordance with an inter-vehicle distance from the vehicle traveling ahead, and predetermined speed control of causing the vehicle to have a predetermined speed, and
   the speed control unit is configured to increase a difference between a switching inter-vehicle distance as a reference for switching between the front vehicle corresponding control, corresponding to travelling speed of the vehicle, and the predetermined speed control, and the target inter-vehicle distance corresponding to the travelling speed, as the travelling speed of the vehicle decreases.

9. The vehicle control device according to claim 1, wherein
the recommended speed acquisition unit acquires a third recommended speed in a third section extending from the second section in a traveling direction of the vehicle,
the determination unit determines a magnitude relationship between the second recommended speed and the third recommended speed, and
the speed control unit causes speed of the vehicle to increase to that of the third recommended speed in the first section when it is determined that the second recommended speed is more than the first recommended speed, and the third recommended speed is more than the second recommended speed.

10. A vehicle control method using a vehicle control device configured to control traveling of a vehicle including a recommended speed acquisition unit that acquires recommended speeds for the vehicle in accordance with traffic conditions in a plurality of sections, the vehicle control method comprising the steps of:
determining, using a determination unit, a magnitude relationship between a first recommended speed in a first section where the vehicle currently travels, and a second recommended speed in a second section extending from the first section in a traveling direction of the vehicle, among the recommended speeds acquired by the recommended speed acquisition unit; and
performing, using a speed control unit, speed control of the vehicle in accordance with the magnitude relationship between the first recommended speed and the second recommended speed determined by the determination unit, wherein
the speed control unit causes a speed of the vehicle to increase to become the second recommended speed in the first section, when the determination unit determines that the second recommended speed is equal to or more than the first recommended speed,
the recommended speed acquisition unit acquires an updated first recommended speed, the updated first recommended speed being a new recommended speed related to the first section,
the determination unit determines a magnitude relationship between the updated first recommended speed and the first recommended speed, and
the speed control unit controls the speed of the vehicle to be maintained at a speed of the first recommended speed in the first section, when the determination unit determines that the updated first recommended speed is less than the first recommended speed.

11. The vehicle control method according to claim 10, wherein when it is determined that the updated first recommended speed is equal to or more than the first recommended speed, the vehicle is increased in speed to have the updated first recommended speed in the first section.

12. The vehicle control method according to claim 10, wherein
the speed of the vehicle is controlled to be maintained at a speed of the first recommended speed after the vehicle reaches the second section from the first section, when it is determined that the second recommended speed is less than the first recommended speed.

13. A vehicle comprising:
a recommended speed acquisition unit capable of acquiring recommended speeds for the vehicle in accordance with traffic conditions in a plurality of sections; and
a vehicle control device configured to control traveling of the vehicle in accordance with the recommended speeds,
the vehicle control device including:
a determination unit that determines a magnitude relationship between a first recommended speed in a first section where the vehicle currently travels, and a second recommended speed in a second section extending from the first section in a traveling direction of the vehicle, among the recommended speeds acquired by the recommended speed acquisition unit; and
a speed control unit that performs a speed control of the vehicle in accordance with the magnitude relationship between the first recommended speed and the second recommended speed determined by the determination unit, wherein
the speed control unit causes a speed of the vehicle to increase to become the second recommended speed in the first section, when the determination unit determines that the second recommended speed is equal to or more than the first recommended speed,
the recommended speed acquisition unit acquires an updated first recommended speed, the updated first recommended speed being a new recommended speed related to the first section,
the determination unit determines a magnitude relationship between the updated first recommended speed and the first recommended speed, and
the speed control unit controls the speed of the vehicle to be maintained at a speed of the first recommended speed in the first section, when the determination unit determines that the updated first recommended speed is less than the first recommended speed.

* * * * *